US012062338B2

(12) United States Patent
Seo et al.

(10) Patent No.: US 12,062,338 B2
(45) **Date of Patent: *Aug. 13, 2024**

(54) SCAN DRIVING CIRCUIT AND DISPLAY DEVICE INCLUDING THE SAME

(71) Applicant: Samsung Display Co., LTD., Yongin-si (KR)

(72) Inventors: Hae-Kwan Seo, Hwaseong-si (KR); Seongheon Cho, Hwaseong-si (KR); Soon-Dong Kim, Osan-si (KR); Taehoon Kim, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,290

(22) Filed: May 26, 2023

(65) Prior Publication Data

US 2023/0298532 A1 Sep. 21, 2023

Related U.S. Application Data

(63) Continuation of application No. 17/864,902, filed on Jul. 14, 2022, now Pat. No. 11,699,400, which is a (Continued)

(30) Foreign Application Priority Data

Jun. 24, 2020 (KR) ........................ 10-2020-0077276

(51) Int. Cl.

| | |
|---|---|
| ***G09G 3/3266*** | (2016.01) |
| ***G09G 3/3233*** | (2016.01) |
| ***G09G 3/3275*** | (2016.01) |

(52) U.S. Cl.

CPC ......... *G09G 3/3266* (2013.01); *G09G 3/3233* (2013.01); *G09G 3/3275* (2013.01); (Continued)

(58) Field of Classification Search

CPC .. G09G 3/3266; G09G 3/3233; G09G 3/3275; G09G 2310/0202; G09G 2310/08; G09G 2320/0238; G09G 2330/021

See application file for complete search history.

(56) References Cited

U.S. PATENT DOCUMENTS

| | | | |
|---|---|---|---|
| 9,886,891 | B2 | 2/2018 | In |
| 9,972,265 | B2 | 5/2018 | Na et al. |

(Continued)

FOREIGN PATENT DOCUMENTS

| | | |
|---|---|---|
| CN | 111199713 | 5/2020 |
| KR | 10-2016-0045215 | 4/2016 |

(Continued)

OTHER PUBLICATIONS

European Office Action for European Application No. 21 177 758.6, dated Jan. 25, 2024.

*Primary Examiner* — Kenneth B Lee, Jr.
(74) *Attorney, Agent, or Firm* — KILE PARK REED & HOUTTEMAN PLLC

(57) ABSTRACT

A scan driving circuit of a display device includes a first output terminal electrically connected to a first scan line, a second output terminal electrically connected to a second scan line, a first masking circuit electrically connecting the first output terminal and the second output terminal and outputting, as a first scan signal, a second scan signal to the first output terminal, a driving circuit outputting the second scan signal to the second output terminal in response to clock signals and a carry signal, and a second masking circuit masking the second scan signal to a predetermined level in response to the second masking signal, wherein the first masking circuit electrically disconnects the first output terminal from the second output terminal in response to a first masking signal.

20 Claims, 21 Drawing Sheets

Related U.S. Application Data continuation of application No. 17/185,358, filed on Feb. 25, 2021, now Pat. No. 11,410,610.

(52) U.S. Cl.
CPC . *G09G 2310/0202* (2013.01); *G09G 2310/08* (2013.01); *G09G 2320/0238* (2013.01); *G09G 2330/021* (2013.01)

(56) References Cited

U.S. PATENT DOCUMENTS

| | | | | |
|---|---|---|---|---|
| 10,198,998 | B2 | 2/2019 | In et al. | |
| 10,923,012 | B1 | 2/2021 | Hu et al. | |
| 11,410,610 | B2 | 8/2022 | Seo et al. | |
| 11,699,400 | B2 * | 7/2023 | Seo | G09G 3/3233 345/213 |
| 2003/0043104 | A1 | 3/2003 | Lee et al. | |
| 2004/0070589 | A1 | 4/2004 | Morita et al. | |
| 2014/0152629 | A1 | 6/2014 | So et al. | |
| 2016/0187917 | A1 | 6/2016 | Lou | |
| 2016/0189794 | A1 | 6/2016 | Lou | |
| 2021/0407431 | A1 | 12/2021 | Kim et al. | |
| 2022/0020327 | A1 | 1/2022 | Cho et al. | |

FOREIGN PATENT DOCUMENTS

| | | |
|---|---|---|
| KR | 10-2016-0141132 | 12/2016 |
| KR | 10-2021-0013505 | 2/2021 |
| KR | 10-2022-0001037 | 1/2022 |
| KR | 10-2022-0008951 | 1/2022 |

* cited by examiner

SCAN DRIVING CIRCUIT AND DISPLAY DEVICE INCLUDING THE SAME

CROSS-REFERENCE TO RELATED APPLICATIONS

This is a continuation application of U.S. patent application Ser. No. 17/864,902 filed Jul. 14, 2022, now U.S. Pat. No. 11,699,400 issued on Jul. 11, 2023, the disclosure of which is incorporated herein by reference in its entirety. U.S. patent application Ser. No. 17/864,902 is a continuation application of U.S. patent application Ser. No. 17/185,358, filed Feb. 25, 2021, now U.S. Pat. No. 11,410,610; issued Aug. 9, 2022, the disclosure of which is incorporated herein by reference in its entirety. U.S. patent application Ser. No. 17/185,358 claims priority to and the benefit of Korean Patent Application No 10-2020-0077276 under 35 U.S.C. § 119, filed in the Korean Intellectual Property Office (KIPO) on Jun. 24, 2020, the entire contents of which are incorporated herein by reference.

BACKGROUND

The disclosure relates to a display device, and more specifically, to a display device including a scan driving circuit.

Among display devices, an organic light emitting display device displays an image using an organic light emitting diode which generates light by recombination of electrons and holes. Such an organic light emitting display device has advantages of having fast response speed and being driven with low power consumption.

An organic light emitting display device is provided with pixels electrically connected to data lines and scan lines. The pixels usually include an organic light emitting diode and a circuit unit for controlling the amount of current flowing into the organic light emitting diode. The circuit unit controls the amount of current flowing from a first driving voltage to a second driving voltage via the organic light emitting diode in correspondence to a data signal. At this time, in correspondence to the amount of the current flowing through the organic light emitting diode, light with a predetermined luminance is generated.

Typically, transistors included in the circuit unit were transistors having a low-temperature polycrystalline silicon (LTPS) layer. LTPS transistors have advantages in terms of high mobility and device stability. However, in case that the voltage level of the second driving voltage is lowered or the operation frequency thereof is lowered, leakage current is generated. In case that there is leakage current in a circuit unit of a pixel, the amount of current flowing through an organic light emitting diode is changed, so that display quality may deteriorate.

Recently, in order to reduce leakage current of a transistor included in a circuit unit in a pixel, studies on transistors including an oxide semiconductor as a semiconductor layer have been conducted. Furthermore, studies on using an LTPS semiconductor transistor and an oxide semiconductor transistor in a circuit unit of a pixel have been conducted.

In addition, there is a need for a technology to reduce power consumption of a display device.

SUMMARY

The disclosure provides a scan driving circuit capable of reducing power consumption and a display device including the same.

An embodiment provides a scan driving circuit including a first output terminal electrically connected to a first scan line, a second output terminal electrically connected to a second scan line, a first masking circuit electrically connecting the first output terminal and the second output terminal and outputting, as a first scan signal, a second scan signal to the first output terminal, a driving circuit outputting the second scan signal to the second output terminal in response to clock signals and a carry signal, and a second masking circuit masking the second scan signal to a predetermined level in response to the second masking signal, wherein the first masking circuit may electrically disconnect the first output terminal from the second output terminal in response to a first masking signal.

The first masking circuit may comprise a first transistor connected between the first output terminal and the second output terminal, the first transistor including a gate electrode electrically connected to an input terminal receiving the first masking signal.

The driving circuit may output a first signal corresponding to the carry signal to a first node in response to the clock signals and the carry signal, and the first masking circuit may comprise a second transistor connected between the first output terminal and an input terminal receiving a first voltage, the second transistor including a gate electrode electrically connected to the first node.

The first masking circuit may include a capacitor connected between the first output terminal and the input terminal receiving the first voltage.

The second masking circuit may include a third transistor electrically connected between the first node and a second node and including a gate electrode electrically connected to an input terminal receiving the second masking signal; and a fourth transistor electrically connected between the second node and the input terminal receiving the first voltage and including a gate electrode electrically connected to the second output terminal.

The first masking circuit may mask the first scan signal to the first voltage in response to the first masking signal, and the second masking circuit may mask the second scan signal to the first voltage in response to the second masking signal.

The first scan signal may be masked to the first voltage, and then the second scan signal is masked to the first voltage.

The scan driving circuit may further include a third masking circuit electrically connecting the first output terminal to the input terminal receiving the first voltage in response to a third masking signal.

The third masking circuit may include a first transistor connected between the first output terminal and the first node and including a gate electrode electrically connected to an input terminal receiving the third masking signal; a second transistor connected between the first node and the input terminal receiving the first voltage and including a gate electrode electrically connected to the first output terminal; a third transistor connected between the first output terminal and the first voltage input terminal and including a gate electrode electrically connected to the input terminal receiving the third masking signal; and a capacitor connected between the first output terminal and the input terminal receiving the first voltage.

In an embodiment, a scan driving circuit may include a first output terminal electrically connected to a first scan line, a second output terminal electrically connected to a second scan line, a first masking circuit electrically connecting the first output terminal and the second output terminal and outputting, as a first scan signal, a second scan signal to the first output terminal, a driving circuit outputting the second scan signal to the second output terminal in response to clock signals and a carry signal, and a second masking circuit masking the first scan signal to a predetermined level in response to the second masking signal, wherein the first masking circuit may electrically disconnect the first output terminal from the second output terminal in response to a first masking signal.

The first output terminal may be electrically disconnected from the second output terminal by the first masking signal, and the first scan signal may be masked to the predetermined level by the second masking signal, and then the clock signals may be maintained at a predetermined level such that the driving circuit does not operate.

The first masking circuit may include a first transistor connected between the first output terminal and the second output terminal, the first transistor including a gate electrode electrically connected to an input terminal receiving the first masking signal; and the second masking circuit may include a second transistor connected between the first output terminal and an input terminal receiving a second voltage, the second transistor including a gate electrode electrically connected to an input terminal receiving the second masking signal.

The driving circuit may output a first signal corresponding to the carry signal to a first node in response to the clock signals and the carry signal and output a second signal to a second node in response to the clock signals and the carry signal, and the second signal may be provided to the second masking circuit as the second masking signal.

In an embodiment, a display device may include a display panel including a plurality of pixels electrically connected to a plurality of data lines and a plurality of scan lines, a data driving circuit driving the plurality of data lines, a scan driving circuit driving the plurality of scan lines, and a driving controller receiving an image signal and a control signal and controlling the data driving circuit and the scan driving circuit such that an image is displayed on the display panel. The driving controller may divide the display panel into a first display region and a second display region based on the image signal and output a first masking signal and a second masking signal indicating a start point of the second display region. The scan driving circuit may include a plurality of first driving stages each driving a corresponding first scan line among the plurality of scan lines and a corresponding second scan line among the plurality of scan lines. Each of the plurality of first driving stages may include a first output terminal electrically connected to the first scan line, a second output terminal electrically connected to the second scan line, a first masking circuit electrically connecting the first output terminal and the second output terminal and outputting, as a first scan signal, the second scan signal to the first output terminal, a first driving circuit outputting the second scan signal to the second output terminal in response to first and second clock signals from the driving controller and a carry signal, and a second masking circuit masking the second scan signal to a predetermined level in response to the second masking signal. The first masking circuit may electrically disconnect the first output terminal from the second output terminal in response to a first masking signal.

The scan driving circuit may drive scan lines corresponding to the first display region among the plurality of scan lines at a first driving frequency in response to the first masking signal and the second masking signal and drive scan lines corresponding to the second display region among the plurality of scan lines at a second driving frequency different from the first driving frequency.

A j-th scan signal of the second scan signal output from a j-th driving stage among the plurality of first driving stages may be provided as the carry signal of a j+k-th driving stage, where each of j and k is a natural number.

The first masking circuit may include a first transistor connected between the first output terminal and the second output terminal, the first transistor including a gate electrode electrically connected to an input terminal receiving the first masking signal.

The first driving circuit may output a first signal corresponding to the carry signal to a first node in response to the first and second clock signals and the carry signal, and the first masking circuit may include a second transistor connected between the first output terminal and an input terminal receiving a first voltage, the second transistor including a gate electrode electrically connected to the first node.

The second masking circuit may include a third transistor connected between the first node and a second node, the third transistor including a gate electrode electrically connected to an input terminal receiving the second masking signal; and a fourth transistor connected between the second node and the input terminal receiving the first voltage, the fourth transistor including a gate electrode electrically connected to the second output terminal.

The scan driving circuit may include a plurality of second driving stages each driving a corresponding third scan line among the plurality of scan lines and a corresponding fourth scan line among the plurality of scan lines.

The driving controller may output a third masking signal and a fourth masking signal indicating the start point of the second display region based on the image signal.

Each of the plurality of second driving stages may include a third output terminal electrically connected to the third scan line; a fourth output terminal electrically connected to the fourth scan line; a third masking circuit electrically connecting the third output terminal and the fourth output terminal and outputting, as a third scan signal, a fourth scan signal to the third output terminal; a second driving circuit outputting the fourth scan signal to the second output terminal in response to third and fourth clock signals from the driving controller and a second carry signal; and a fourth masking circuit masking the third scan signal to a predetermined level in response to the fourth masking signal, the third masking circuit electrically disconnecting the third output terminal from the fourth output terminal in response to the third masking signal.

The third masking circuit may include a first transistor connected between the third output terminal and the fourth output terminal, the first transistor circuit including a gate electrode electrically connected to an input terminal receiving the third masking signal; and the fourth masking circuit may include a second transistor connected between the third output terminal and an input terminal receiving a second voltage, the second transistor including a gate electrode electrically connected to an input terminal receiving the fourth masking signal.

The driving controller may maintain the third and fourth clock signals at a predetermined level such that the second driving circuit does not operate after the third masking signal is changed from a first level to a second level and the fourth masking signal is changed from the second level to the first level.

Each of the plurality of pixels may include first-type transistors electrically connected to the first scan line and the second scan line and second-type transistors electrically connected to the third scan line and the fourth scan line.

The first-type transistors may be N-type transistors, and the second-type transistors may be P-type transistors.

In an embodiment, a display device may include a display panel including a plurality of pixels electrically connected to a plurality of data lines and a plurality of scan lines, a data driving circuit driving the plurality of data lines, a scan driving circuit driving the plurality of scan lines, and a driving controller receiving an image signal and a control signal and controlling the data driving circuit and the scan driving circuit such that an image is displayed on the display panel. The driving controller may divide the display panel into a first display region and a second display region based on the image signal and output a first masking signal and a second masking signal indicating a start point of the second display region, and the scan driving circuit may include a plurality of driving stages each driving a corresponding first scan line among the plurality of scan lines and a corresponding second scan line among the plurality of scan lines. Each of the plurality of driving stages may include a first output terminal electrically connected to the first scan line, a second output terminal electrically connected to the second scan line, a first masking circuit electrically connecting the first output terminal and the second output terminal and outputting, as a first scan signal, a second scan signal as a first scan signal to the first output terminal, a driving circuit outputting the second scan signal to the second output terminal in response to clock signals from the driving controller and a carry signal, and a second masking circuit masking the first scan signal to a predetermined level in response to the second masking signal. The first masking circuit may electrically disconnect the first output terminal from the second output terminal in response to the first masking signal.

The first output terminal may be electrically disconnected from the second output terminal by the first masking signal, and the first scan signal may be masked to the predetermined level by the second masking signal, and then the clock signals are maintained at a predetermined level such that the driving circuit does not operate.

BRIEF DESCRIPTION OF THE DRAWINGS

The accompanying drawings are included to provide a further understanding of the disclosure and are incorporated in and constitute a part of this specification. The drawings illustrate some embodiments of the disclosure and, together with the description, serve to explain principles of the disclosure. In the drawings.

DETAILED DESCRIPTION OF THE EMBODIMENTS

Figure 1:
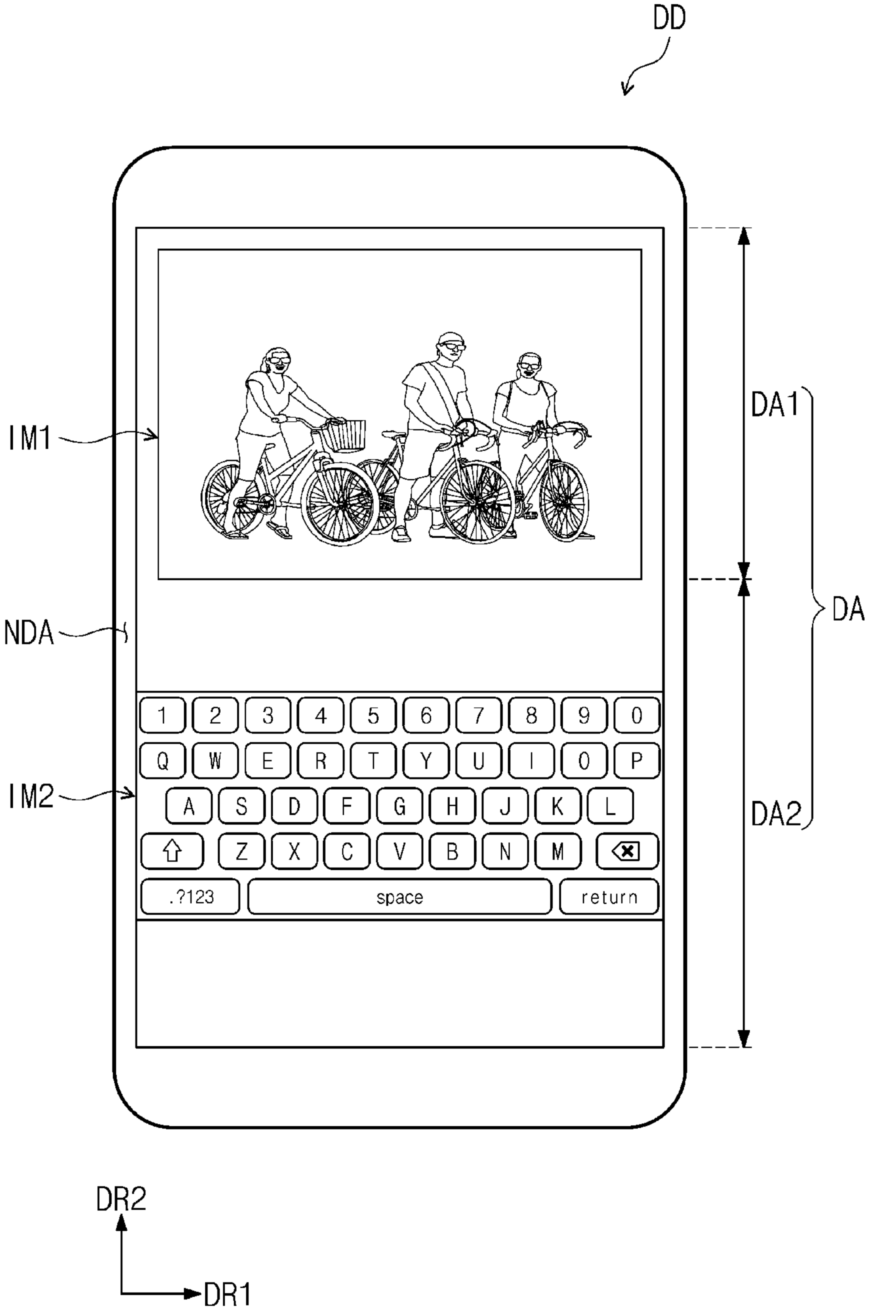
FIG. 1 is a schematic plan view of a display device according to an embodiment.

In the disclosure, when an element (or a region, a layer, a portion, etc.) is referred to as being "on," "connected to," or "coupled to" another element, it means that the element may be directly disposed on/connected to/coupled to the other element or that a third element may be disposed therebetween.

Like reference numerals refer to like elements. In the drawings, the thickness, the ratio, and the dimensions of elements may be exaggerated for an effective description of embodiments. The term "and/or," includes all combinations of one or more of which associated configurations may define. For example, "A and/or B" may be understood to mean "A, B, or A and B." In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms "first," "second," or the like may be used herein to describe various elements, these elements should not be limited by these terms. These terms are only used to distinguish one element from another. For example, a first element could be termed a second element, and, similarly, a second element could be termed a first element, without departing from the scope of embodiments of the disclosure. The terms of a singular form may include plural forms unless the context clearly indicates otherwise.

Terms such as "below," "lower," "above," "upper," and the like are used to describe the relationship of the configurations shown in the drawings. The terms are used as a relative concept and are described with reference to the direction indicated in the drawings.

It should be understood that the terms "comprise," "include," or "have" are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined or implied herein, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with their meanings in the context of the related art and the disclosure, and should not be interpreted in an ideal or excessively formal sense unless clearly defined in the disclosure.

Hereinafter, embodiments of the disclosure will be described with reference to the accompanying drawings.

FIG. 1 is a schematic plan view of a display device according to an embodiment of the disclosure.

Referring to FIG. 1, as an example of a display device DD according to an embodiment, a portable terminal is illustrated. A portable terminal may include a tablet PC, a smart phone, a personal digital assistant (PDA), a portable multimedia player (PMP), a game console, a wristwatch-type electronic device, and the like. However, the embodiments are not limited thereto. The disclosure may be used for large electronic devices such as a television or an external advertisement board, and also for small and medium-sized electronic devices such as a personal computer, a laptop computer, a kiosk, a car navigation system unit, and a camera. It should be understood that these are merely examples and may be employed in other electronic devices without departing from the disclosure.

As illustrated in FIG. 1, a display surface on which a first image IM1 and a second image IM2 are displayed may be parallel to a plane defined by a first direction DR1 and a second direction DR2. The display device DD may include regions separated on the display surface. The display surface may include a display region DA on which the first image IM1 and the second image IM2 are displayed and a non-display region NDA adjacent to the display region DA. The non-display region NDA may be referred to as a bezel region. As an example, the display region DA may have a quadrangular shape. The non-display region NDA may surround the display region DA. Although not shown, as an example, the display device DD may include a partially curved shape. As a result, a region of the display device DD may have a curved shape.

The display region DA of the display device DD may include a first display region DA1 and a second display region DA2. In a specific application program, the first image IM1 may be displayed in the first display region DA1, and the second image IM2 may be displayed in the second display region DA2. For example, the first image IM1 may be a moving image, and the second image IM2 may be a still image or include changing texts having a change period.

The display device DD according to an embodiment may drive the first display region DA1 in which a moving picture is displayed at a normal frequency and may drive the second display region DA2 in which a still image is displayed at a frequency lower than the normal frequency. The display device DD may reduce power consumption by lowering the driving frequency of the second display region DA2.

The size of each of the first display region DA1 and the second display region DA2 may be a preset size and may be changed by an application program. In an embodiment, in case that the first display region DA1 displays a still image and the second display region DA2 displays a moving image, the first display region DA1 may be driven at a lower frequency, and the second display region DA2 may be driven at a normal frequency. The display region DA may be divided into three or more display regions, and according to the type of an image (still image or moving image) displayed in each of the display regions, a driving frequency of each of the display regions may be determined.

Figure 2:
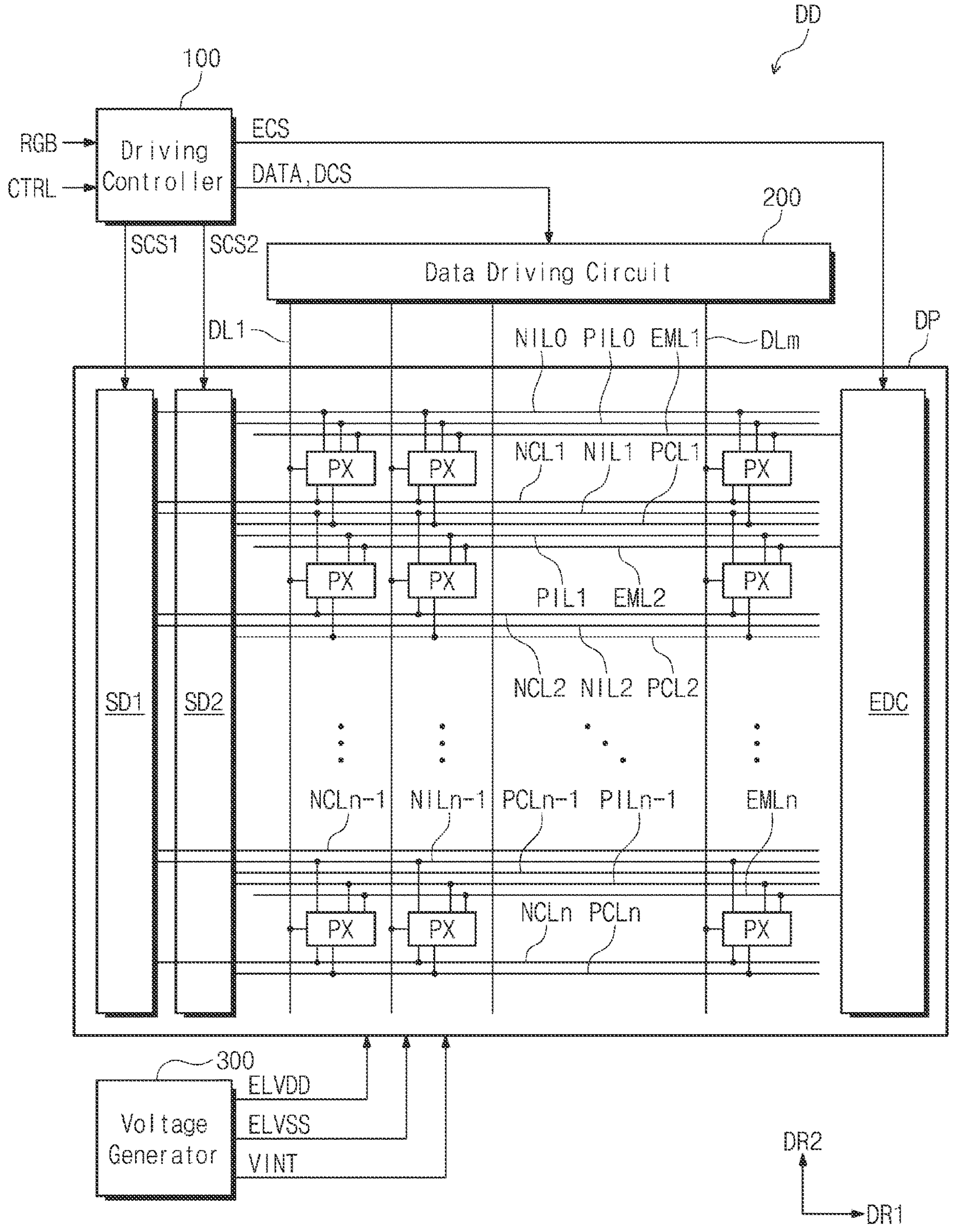
FIG. 2 is a schematic block diagram of a display device according to an embodiment.

FIG. 2 is a schematic block diagram of a display device according to an embodiment.

Referring to FIG. 2, the display device DD may include a display panel DP, a driving controller 100, a data driving circuit 200, and a voltage generator 300.

The driving controller 100 may receive an image signal RGB and a control signal CTRL. The driving controller 100 may generate an image data signal DATA obtained by converting the data format of the image signal RGB to meet the interface specifications of the data driving circuit 200. The driving controller 100 may output a first scan control signal SCS1, a second scan control signal SCS2, a data control signal DCS, and a light emission control signal ECS.

The data driving circuit 200 may receive the data control signal DCS and the image data signal DATA from the driving controller 100. The data driving circuit 200 may convert the image data signal DATA into data signals and may output the data signals to data lines DLi (e.g., DL1 to DLm), which are described below. The data signals may be analog voltages corresponding to gray scale values of the image data signal DATA.

The voltage generator 300 may generate voltages required for the operation of the display panel DP. In this embodiment, the voltage generator 300 may generate a first driving voltage ELVDD, a second driving voltage ELVSS, and an initialization voltage VINT.

The display panel DP may include first scan lines NIL0 to NILn−1, second scan lines NCL1 to NCLn, third scan lines PIL0 to PILn−1, fourth scan lines PCL1 to PCLn, light emission control lines EML1 to EMLn, the data lines DL1 to DLm, and pixels PX. The display panel DP may further include a first scan driving circuit SD1, a second scan driving circuit SD2, and a light emission driving circuit EDC. In an embodiment, the first scan driving circuit SD1 and the second scan driving circuit SD2 may be arranged on a side of the display panel DP, and the light emission driving circuit EDC may be arranged on another side of the display panel DP. The first scan driving circuit SD1 and the second scan driving circuit SD2 may be arranged facing the light emission driving circuit EDC in the first direction DR1 with the pixels PX interposed therebetween.

The first scan lines NIL0 to NILn−1 and the second scan lines NCL1 to NCLn may extend in the first direction DR1 from the first scan driving circuit SD1. The third scan lines PIL0 to PILn−1 and the fourth scan lines PCL1 to PCLn may extend in the first direction DR1 from the second scan driving circuit SD2. The light emission control lines EML1 to EMLn may extend from the light emission driving circuit EDC in a direction opposite to the first direction DR1.

The first scan lines NIL0 to NILn−1, the second scan lines NCL1 to NCLn, the third scan lines PIL0 to PILn−1, the fourth scan lines PCL1 to PCLn, and the light emission control lines EML1 to EMLn may be arranged spaced apart from each other in the second direction DR2. The data lines DL1 to DLm may extend from the data driving circuit 200 in a direction opposite to the second direction DR2 and may be spaced apart from each other in the first direction DR1.

Each of the pixels PX may be electrically connected to a corresponding one of the first scan lines NIL0 to NILn−1, a corresponding one of the second scan lines NCL1 to NCLn, a corresponding one of the third scan lines PIL0 to PILn−1, a corresponding one of the fourth scan lines PCL1 to PCLn, a corresponding one of the light emission control lines EML1 to EMLn, and a corresponding one of the data lines DL1 to DLm, respectively. Each of the pixels PX may be electrically connected to four scan lines. For example, as illustrated in FIG. 2, pixels PX in a first row may be electrically connected to scan lines NIL0, PIL0, NCL1, and PCL1. Pixels PX in a second row may be electrically connected to the scan lines NIL1, PIL1, NCL2, and PCL2.

Each of the pixels PX may include a light emitting diode ED (see FIG. 3) and a pixel circuit unit PXC (see FIG. 3) which controls the light emission of a light emitting diode. The light emitting diode ED may be an organic light emitting diode. The pixel circuit unit PXC may include transistors and a capacitor. At least any one of the first scan driving circuit SD1, the second scan driving circuit SD2, and the light emission driving circuit EDC may include transistors formed through the same process as a process for forming transistors of the pixel circuit unit PXC.

Each of the pixels PX may receive the first driving voltage ELVDD, the second driving voltage ELVSS, and the initialization voltage VINT.

The first scan driving circuit SD1 may receive the first scan control signal SCS1 from the driving controller 100. The first scan driving circuit SD1 may output first scan signals to the first scan lines NIL0 to NILn−1 and output second scan signals to the second scan lines NCL1 to NCLn in response to the first scan control signal SCS1.

The second scan driving circuit SD2 may receive the second scan control signal SCS2 from the driving controller 100. The second scan driving circuit SD2 may output third scan signals to the third scan lines PIL0 to PILn−1 and output fourth scan signals to the fourth scan lines PCL1 to PCLn in response to the second scan control signal SCS2.

The circuit configuration of operation of the first scan driving circuit SD1 and the second scan driving circuit SD2 will be described in detail below.

The light emission driving circuit EDC may receive the light emission control signal ECS from the driving controller 100. The light emission driving circuit EDC may output light emission control signals to the light emission control lines EML1 to EMLn in response to the light emission control signal ECS.

In FIG. 2, the first scan driving circuit SD1 and the second scan driving circuit SD2 are illustrated as being arranged on a first side of the display panel DP, but the embodiments are not limited thereto. In another embodiment, a third scan driving circuit and a fourth scan driving circuit may be further disposed on a second side of the display panel DP. In this case, the first scan driving circuit SD1 and the third scan driving circuit may commonly drive the first scan lines NIL0 to NILn−1 and the second scan lines NCL1 to NCLn, and the second scan driving circuit SD2 and the fourth scan driving circuit may commonly drive the third scan lines PIL0 to PILn−1 and the fourth scan lines PCL1 to PCLn.

The driving controller 100 according to an embodiment may divide the display panel DP into the first display region DA1 (see FIG. 1) and the second display region DA2 (see FIG. 1) on the basis of the image signal RGB and may output at least one masking signal indicating the start point of the second display region DA2. The at least one masking signal may be included in the first scan control signal SCS1 and the second scan control signal SCS2.

The first scan driving circuit SD1 according to an embodiment may drive first and second scan lines corresponding to the first display region DA1 among the first scan lines NIL0 to NILn−1 and the second scan lines NCL1 to NCLn at a first driving frequency in response to the first scan control signal SCS1 and may drive first and second scan lines corresponding to the second display region DA2 among the same at a second driving frequency different from the first driving frequency.

In the same manner, the second scan driving circuit SD2 may drive third and fourth scan lines corresponding to the first display region DA1 among the third scan lines PIL0 to PILn−1 and the fourth scan lines PCL1 to PCLn at a first driving frequency in response to the second scan control signal SCS2, and may drive third and fourth scan lines corresponding to the second display region DA2 among the same at a second driving frequency different from the first driving frequency.

Figure 3:
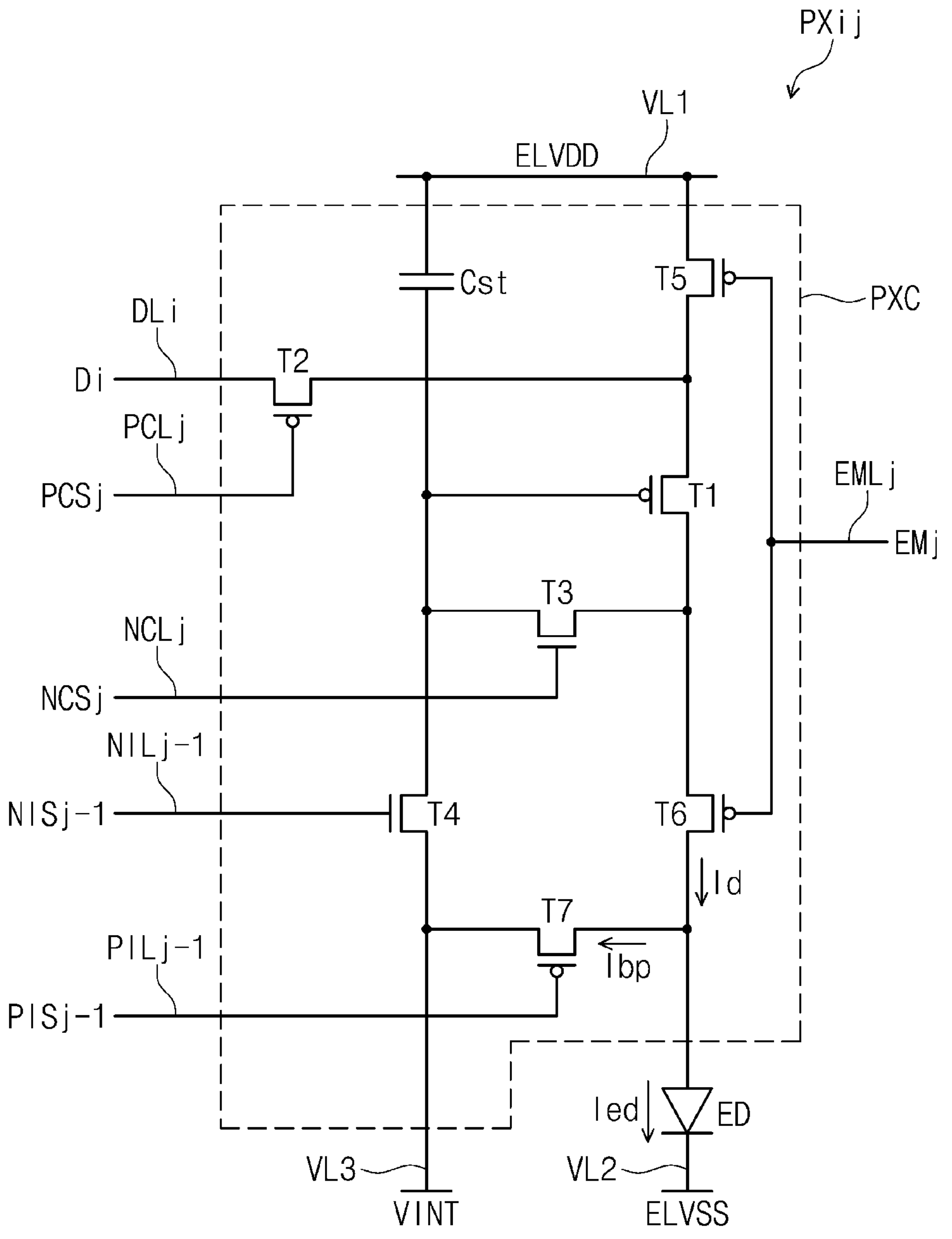
FIG. 3 is a schematic equivalent circuit diagram of a pixel according to an embodiment.

FIG. 3 is a schematic equivalent circuit diagram of a pixel according to an embodiment.

FIG. 3 illustrates an equivalent circuit diagram of a pixel PXij electrically connected to an i-th data line DLi among the data lines DL1 to DLm, a j−1-th first scan line NILj−1 among the first scan lines NIL0 to NILn−1, a j-th second scan line NCLj among the second scan lines NCL1 to NCLn, a j−1-th third scan line PILj−1 among the third scan lines PIL0 to PILn−1, and a j-th fourth scan line PCLj among the fourth scan lines PCL1 to PCLn, and a j-th light emission control line EMLj among the light emission control lines EML1 to EMLn illustrated in FIG. 2.

Each of the pixels PX illustrated in FIG. 2 may have the same circuit configuration as that shown in the equivalent circuit diagram of the pixel PXij illustrated in FIG. 3. In this embodiment, the pixel circuit unit PXC of the pixel PXij may include first to seventh transistors T1 to T7 and a capacitor Cst. Each of the first, second, fifth, sixth, and seventh transistors may be a P-type transistor including a low-temperature polycrystalline silicon (LTPS) semiconductor layer, and each of the third and fourth transistors T3 and T4 may be an N-type transistor having an oxide semiconductor as a semiconductor layer. However, the embodiment is not limited thereto. At least one of the first to seventh transistors T1 to T7 may be an N-type transistor, and the rest thereof may be a P-type transistor. The circuit configuration of a pixel PX according to the disclosure is not limited to that shown in FIG. 3. The pixel circuit unit PXC illustrated in FIG. 3 is only an example, and the configuration of the pixel circuit unit PXC may be modified.

Referring to FIG. 3, the pixel PXij of a display device DD according to an embodiment may include the first to seventh transistors T1 to T7, the capacitor Cst, and at least one light emitting diode ED. In this embodiment, a single pixel PXij including a single light emitting diode ED will be described as an example.

For convenience of explanation, the j−1-th first scan line NILj−1, the j-th second scan line NCLj, the j−1-th third scan line PILj−1, and the j-th fourth scan line PCLj, the j-th light emission control line EMLj may be referred to as a first scan line NILj−1, a second scan line NCLj, a third scan line PILj−1, a fourth scan line PCLj, and the light emission control line EMLj.

The first to fourth scan lines NILj−1, NCLj, PILj−1, and PCLj may transmit first to fourth scan signals NISj−1, NCSj, PISj−1, and PCSj, respectively. The first scan signal NISj−1 may turn on or off the fourth transistor T4, which is a N-type transistor. The second scan signal NCSj may turn on or off the third transistor T3, which is a N-type transistor. The third scan signal PISj−1 may turn on or off the seventh transistor T7, which is a P-type transistor. The fourth scan signal PISj may turn on or off the second transistor T2, which is a P-type transistor.

The light emission control line EMLj may transmit a light emission control signal EMj capable of controlling the light emitting diode ED included in the pixel PXij. The light emission control signal EMj transmitted by the light emission control line EMLj may have a different waveform from the scan signals NISj−1, NCSj, PISj−1, and PCSj transmitted by the first to fourth scan lines NILj−1, NCLj, PILj−1, and PCLj. The data line DLi may transmit a data signal Di. The data signal Di may have a voltage level corresponding to the image signal RGB input to the display device DD (see FIG. 2). First to third driving voltage lines VL1, VL2, and VL3 may transmit the first driving voltage ELVDD, the second driving voltage ELVSS, and the initialization voltage VINT.

The first transistor T1 may include a first electrode electrically connected to the first driving voltage line VL1 via the fifth transistor T5, a second electrode electrically connected to an anode of the light emitting diode ED via the sixth transistor T6, and a gate electrode electrically connected to an end of the capacitor Cst. The first transistor T1 may receive the data signal Di transmitted by the data line DLi in accordance with the switching operation of the second transistor T2 and may supply a driving current Id to the light emitting diode ED.

The second transistor T2 may include a first electrode electrically connected to the data line DLi, a second electrode electrically connected to the first electrode of the first transistor T1, and a gate electrode electrically connected to the fourth scan line PCLj. The second transistor T2 may be turned on according to the fourth scan signal PCSj received through the fourth scan line PCLj and may transmit the data signal Di transmitted from the data line DLi to the first electrode of the first transistor T1.

The third transistor T3 may include a first electrode electrically connected to the gate electrode of the first transistor T1, a second electrode electrically connected to the second electrode of the first transistor T1, and a gate electrode electrically connected to the second scan line NCLj. The third transistor T3 may be turned on according to the second scan signal NCSj received through the second scan line NCLj and electrically connect the gate electrode and the second electrode of the first transistor T1 to diode connect the first transistor T1.

The fourth transistor T4 may include a first electrode electrically connected to the gate electrode of the first transistor T1, a second electrode electrically connected to the third driving voltage line VL3 through which the initialization voltage VINT is transmitted, and a gate electrode electrically connected to the first scan line NILj−1. The fourth transistor T4 may be turned on according to the first scan signal NISj−1 received through the first scan line NILj−1 and transmit the initialization voltage VINT to the gate electrode of the first transistor T1 to perform an initialization operation for initializing the voltage of the gate electrode of the first transistor T1.

The fifth transistor T5 may include a first electrode electrically connected to the first driving voltage line VL1, a second electrode electrically connected to the first electrode of the first transistor T1, and a gate electrode connected electrically to the light emission control line EMLj.

The sixth transistor T6 may include a first electrode electrically connected to the second electrode of the first transistor T1, a second electrode electrically connected to the anode of the light emitting diode ED, and a gate electrode electrically connected to the light emission control line EMLj.

The fifth transistor T5 and the sixth transistor T6 may be simultaneously turned on according to the light emission control signal EMj received through the light emission control line EMLj, and as a result, the first driving voltage ELVDD may be compensated for through the diode connected first transistor T1 and transmitted to the light emitting diode ED.

The seventh transistor T7 may include a first electrode electrically connected to the second electrode of the fourth transistor T4, a second electrode electrically connected to the second electrode of the sixth transistor T6, and a gate electrode electrically connected to the third scan line PILj−1.

The end of the capacitor Cst may be connected to the gate electrode of the first transistor T1 as described above, and the other end thereof may be electrically connected to the first driving voltage line VL1. A cathode of the light emitting diode ED may be electrically connected to the second driving power line VL2 for transmitting the second driving voltage ELVSS. The structure of the pixel PXij according to an embodiment is not limited to that illustrated in FIG. 3. The number of transistors and capacitors included in the pixel PXij and the connection relationship thereof may be variously modified.

Figure 4:
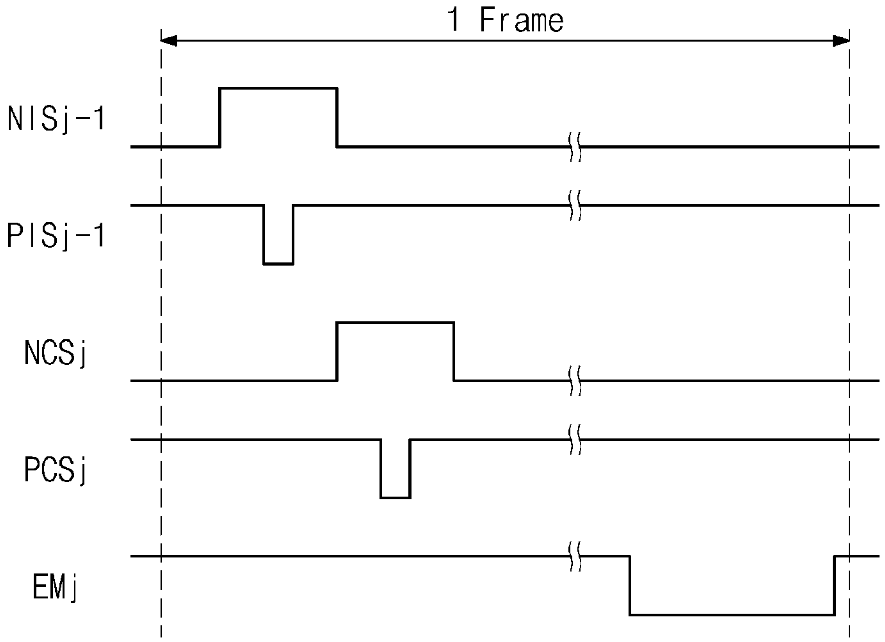
FIG. 4 is a schematic timing diagram for explaining the operation of a pixel of the display device of FIG. 3.

FIG. 4 is a schematic timing diagram for explaining the operation of a pixel of the display device of FIG. 3. Referring to FIGS. 3 and 4, the operation of a display device according to an embodiment will be described.

Referring FIGS. 3 and 4, during an initialization period within a frame, the first scan signal NISj−1 of a high level may be supplied through the first scan line NILj−1. In response to the first scan signal NISj−1 of a high level, the fourth transistor T4 may be turned on, and the initialization voltage VINT may be transmitted through the fourth transistor T4 to the gate electrode of the first transistor T1 to initialize the first transistor T1.

The seventh transistor T7 may be turned on by being supplied with the third scan signal PISj−1 of a low level through the third scan line PILj−1. A portion of the driving current Id may exit through the seventh transistor T7 as a bypass current Ibp by the seventh transistor T7.

If the light emitting diode ED emits light in case that a minimum current of the first transistor T1 for displaying a black image flows as a driving current, the black image may not be properly displayed. Accordingly, the seventh transistor T7 in the pixel PXij according to an embodiment may distribute a portion of the minimum current of the first transistor T1 as the bypass current Ibp into a current path other than a current path on the side of an organic light emitting diode. Here, the minimum current of the first transistor T1 refers to a current under a condition that the first transistor T1 is turned off since a gate-source voltage Vgs of the first transistor T1 is less than the threshold voltage Vth. As such, the minimum driving current (for example, a current of 10 pA or less) under the condition that the first transistor T1 is turned off may be transmitted to the light emitting diode ED and displayed as a black image. In case that the minimum driving current for displaying the black image flows, the effect of the bypass transmission of the bypass current Ibp may be significant. However, in case that a large driving current for displaying an image, such as a normal image or a white image, flows, there is little effect of the bypass current Ibp. Accordingly, in case that a driving current for displaying a black image flows, a light emitting current Ted of the light emitting diode ED reduced by the amount of the bypass current Ibp exiting through the seventh transistor T7 from the driving current Id may have a minimum amount of current at a level so as to reliably display the black image. Accordingly, an image of correct black luminance may be implemented using the seventh transistor T7, so that the contrast ratio may be improved. In this embodiment, a bypass signal may be the third scan signal PISj−1 of a low level but is not limited thereto.

Next, in case that the second scan signal NCSj of a high level is supplied through the second scan line NCLj during data programming and a compensation period, the third transistor T3 may be turned on. The first transistor T1 may be diode-connected by the turned-on third transistor T3 and be biased in a forward direction. In case that the fourth scan signal PCSj of a low level is supplied through the fourth scan line PCLj, the second transistor T2 may be turned on. Then, a compensation voltage Di-Vth reduced by a threshold voltage Vth of the first transistor T1 from the data signal Di supplied from the data line DLi may be applied to the gate electrode of the first transistor T1. For example, a gate voltage applied to the gate electrode of the first transistor T1 may be the compensation voltage Di-Vth.

The first driving voltage ELVDD and the compensation voltage Di-Vth may be applied to both ends of the capacitor Cst, and electric charges corresponding to the voltage difference between both the ends may be stored in the capacitor Cst.

Next, the light emission control signal EMj supplied from the light emission control line EMLj during a light emitting period may be changed from a high level to a low level. During the light emitting period, the fifth transistor T5 and the sixth transistor T6 may be turned on by a low level light emission control signal EMj. Then, the driving current Id corresponding to the voltage difference between the gate voltage of the gate electrode of the first transistor T1 and the first driving voltage ELVDD may be generated, and through the sixth transistor T6, the driving current Id may be supplied to the light emitting diode ED such that the light emitting current Ied flows in the light emitting diode ED. During the light emitting period, the gate-source voltage Vgs of the first transistor T1 may be maintained as (Di-Vth)-ELVDD [V] by the capacitor Cst, and according to the current-voltage relationship of the first transistor T1, the driving current Id may be proportional to $(\text{Di-ELVDD})^2$ [V], the square of a value obtained by subtracting the threshold voltage Vth from a driving gate-source voltage. Accordingly, the driving current Id may be determined regardless of the threshold voltage Vth of the first transistor T1.

Figure 5:
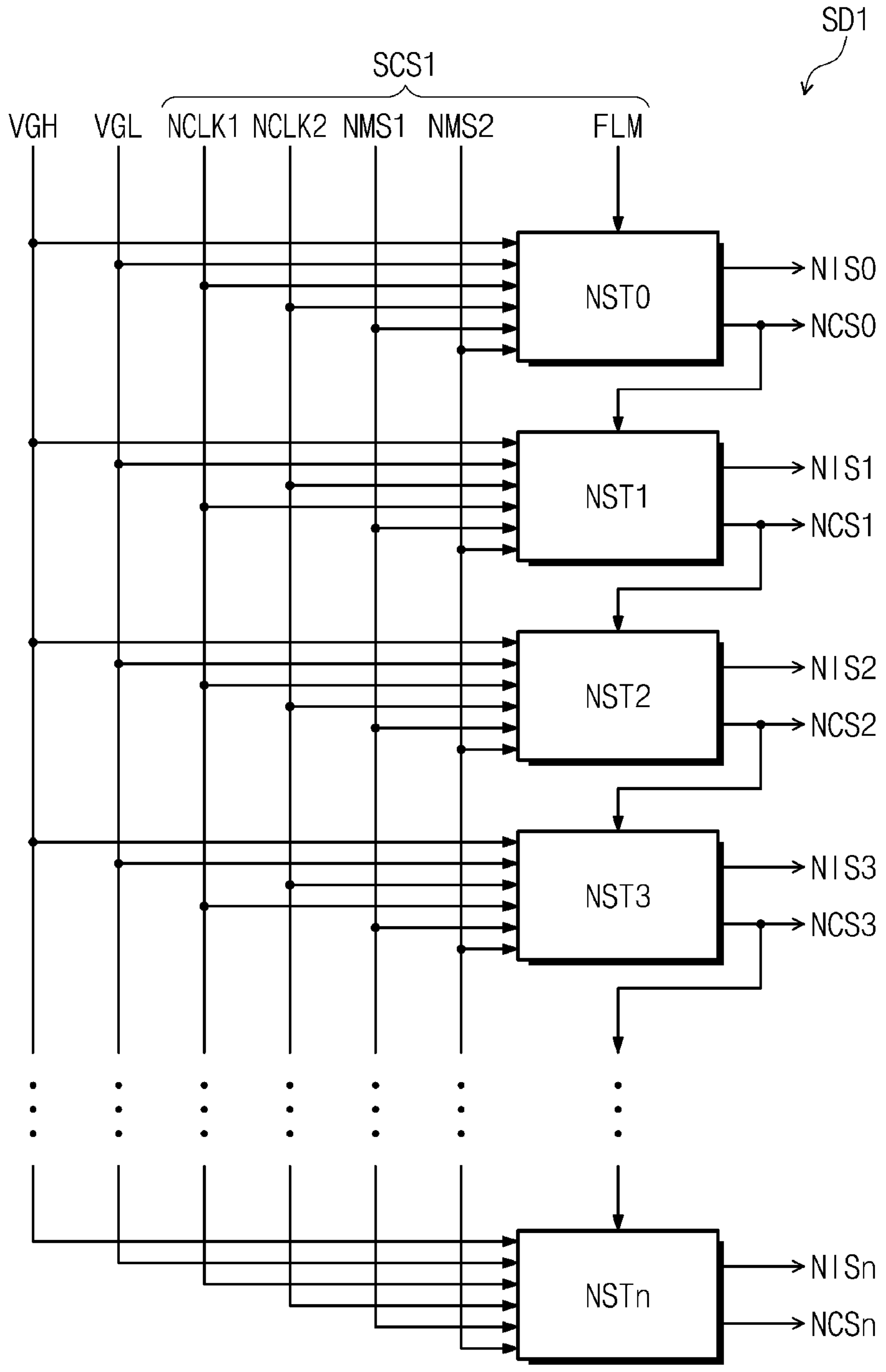
FIG. 5 is a schematic block diagram of a first scan driving circuit according to an embodiment.

FIG. 5 is a schematic block diagram of the first scan driving circuit SD1 according to an embodiment.

Referring to FIG. 5, the first scan driving circuit SD1 may include driving stages NST0 to NSTn.

Each of the driving stages NST0 to NSTn may receive the first scan control signal SCS1 from the driving controller 100 illustrated in FIG. 2. The first scan control signal SCS1 may include a start signal FLM, a first clock signal NCLK1, a second clock signal NCLK2, a first masking signal NMS1, and a second masking signal NMS2. Each of the driving stages NST0 to NSTn may receive a first voltage VGL and a second voltage VGH. The first voltage VGL and the second voltage VGH may be provided from the voltage generator 300 illustrated in FIG. 2.

The first masking signal NMS1 and the second masking signal NMS2 may be signals for driving some of the driving stages NST0 to NSTn at a normal frequency and driving the rest thereof at a low frequency.

In an embodiment, the driving stages NST0 to NSTn may output first scan signals NIS0 to NISn and second scan signals NCS0 to NCSn. The first scan signals NIS0 to NISn−1 may be provided to the first scan lines NIL0 to NILn−1 illustrated in FIG. 2, and the second scan signals NCS1 to NCSn may be provided to the second scan lines NCL1 to NCLn illustrated in FIG. 2.

The driving stage NST0 may receive the start signal FLM as a carry signal. Each of the driving stages NST1 to NSTn may have a dependent connection relation in which a second scan signal output from a previous driving stage is received as a carry signal. For example, the driving stage NST1 may receive the second scan signal NCS0 output from the previous driving stage NST0 as a carry signal, and the driving stage NST2 may receive the second scan signal NCS1 output from the previous driving stage NST1 as a carry signal.

Figure 6:
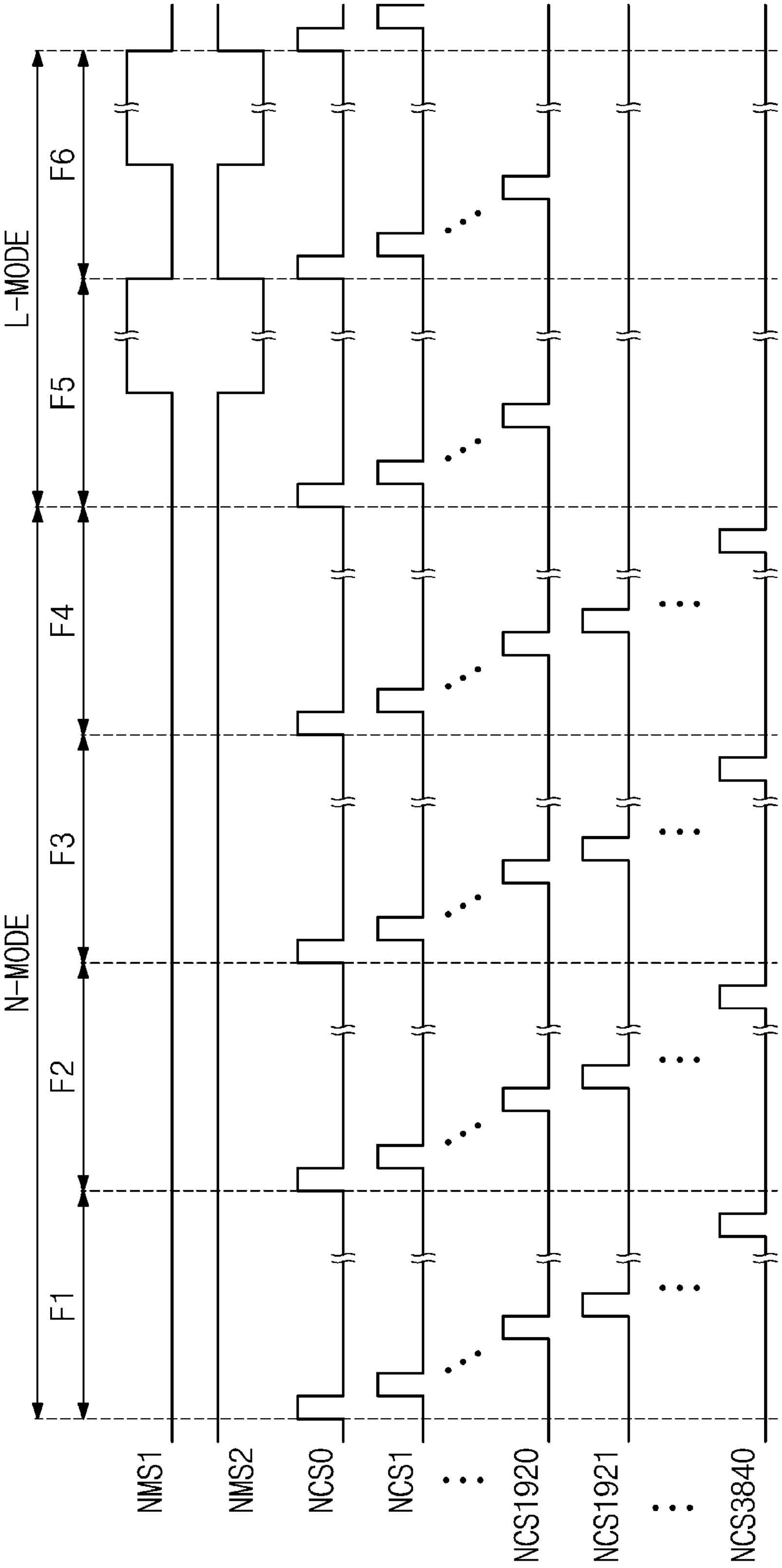
FIG. 6 is a schematic timing diagram illustrating second scan signals output from a first scan driving circuit SD1 illustrated in FIG. 5 in a normal mode and a low power mode.

FIG. 6 is a schematic diagram showing the second scan signals NCS0 to NCSn output from the first scan driving circuit SD1 illustrated in FIG. 5 in a normal mode and a low power mode.

Referring to FIGS. 5 and 6, during a normal mode N-MODE, the first masking signal NMS1 may be maintained at a first level (e.g., low level), and the second masking signal NMS2 may be maintained at a second level (e.g., high level).

During the normal mode N-MODE, the driving stages NST0 to NSTn may sequentially output the second scan signals NCS0 to NCSn at a high level in each of frames F1, F2, F3, and F4.

The first masking signal NMS1 may be changed from a low level to a high level at the start point of the second display region DA2 (see FIG. 1) which is driven at a low frequency during a low power mode L-MODE and may be changed back to a low level when the next frame starts. The second masking signal NMS2 may be changed from a high level to a low level at the start point of the second display region DA2 (see FIG. 1) and may be changed back to a high level when the next frame starts.

For example, the first masking signal NMS1 may be a signal which is maintained at the first level (e.g., low level) during the normal mode N-MODE and which periodically changes during the low power mode L-MODE. The second masking signal NMS2 may be a signal which is maintained at the second level (e.g., high level) during the normal mode N-MODE and which periodically changes during the low power mode L-MODE.

For example, when the low power mode L-MODE starts from a fifth frame F5, the first image IM1 as illustrated in FIG. 1 may be displayed in the first display region DA1, and the second image IM2 may be displayed in the second display region DA2. While the first masking signal NMS1 is maintained at a low level and the second masking signal NMS2 is maintained at a high level at the start point of the fifth frame F5, second scan signals NCS0 to NCS1920 may be sequentially driven at a high level. After the first masking signal NMS1 is changed to a high level and the second masking signal NMS2 is changed to a low level in the fifth frame F5, second scan signals NCS1921 to NCS3840 may be maintained at a low level. When the fifth frame F5 ends and a sixth frame F6 starts, the first masking signal NMS1 may be changed back to a low level, and the second masking signal NMS2 may be changed back to a high level.

As in the case of the fifth frame F5, while the first masking signal NMS1 is maintained at a low level and the second masking signal NMS2 is maintained at a high level in the sixth frame F6, the second scan signals NCS0 to NCS1920 may be sequentially driven at a high level. After the first masking signal NMS1 is changed to a high level and the second masking signal NMS2 is changed to a low level in the middle of the sixth frame F6, the second scan signals NCS1921 to NCS3840 may be maintained at a low level.

Figure 7:
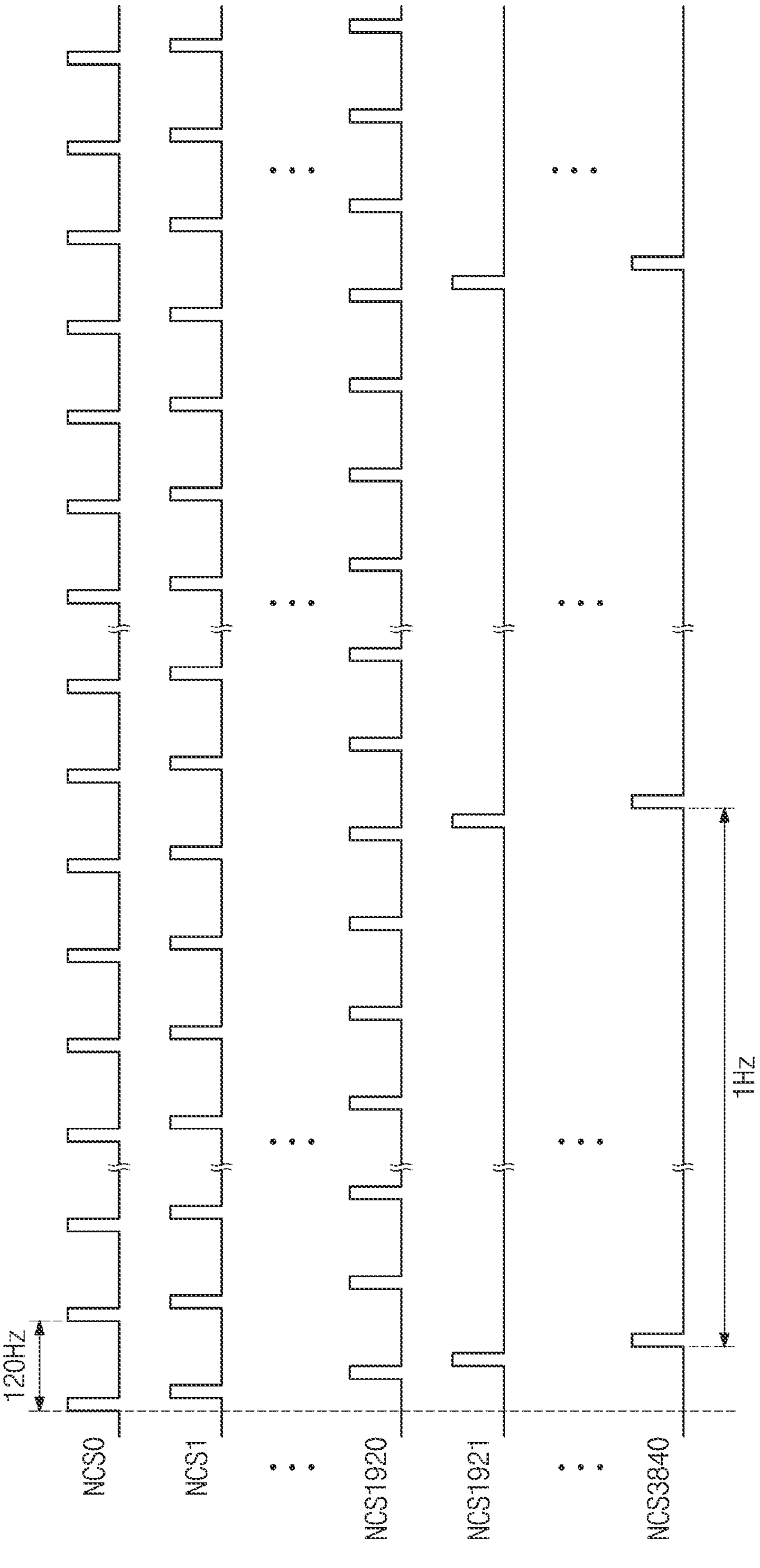
FIG. 7 is a schematic timing diagram illustrating second scan signals in a low power mode.

FIG. 7 shows the second scan signals NCS0 to NCSn in a low power mode.

Referring to FIG. 7, in the low power mode L-MODE, the frequency of the second scan signals NCS0 to NCS1920 may be about 120 Hz, and the frequency of the second scan signals NCS1921 to NCS3840 may be about 1 Hz. Although not illustrated in the drawings, first scan signals NIS0 to NIS3840 and second scan signals NCS0 to NCS3840 may have the same waveform.

For example, the second scan signals NCS0 to NCS1920 may correspond to the first display region DA1 of the display device DD illustrated in FIG. 1, and the second scan signals NCS1921 to NCS3840 may correspond to the second display region DA2. The first display region DA1 in which a moving image is displayed may be driven by the second scan signals NCS0 to NCS1920 of a normal frequency (e.g., about 120 Hz), and the second display region DA2 in which a still image is displayed may be driven by the second scan signals NCS1921 to NCS3840 of a low frequency (e.g., about 1 Hz). Therefore, since only the second display region DA2 in which a still image is displayed is driven at a low frequency, power consumption may be reduced without the deterioration in display quality. Since some of the scan signals NCS0 to NCS3840 are driven at a normal frequency in the low power mode and the rest thereof is driven at a low frequency, the low power mode may be referred to as a multi-frequency mode.

Figure 8:
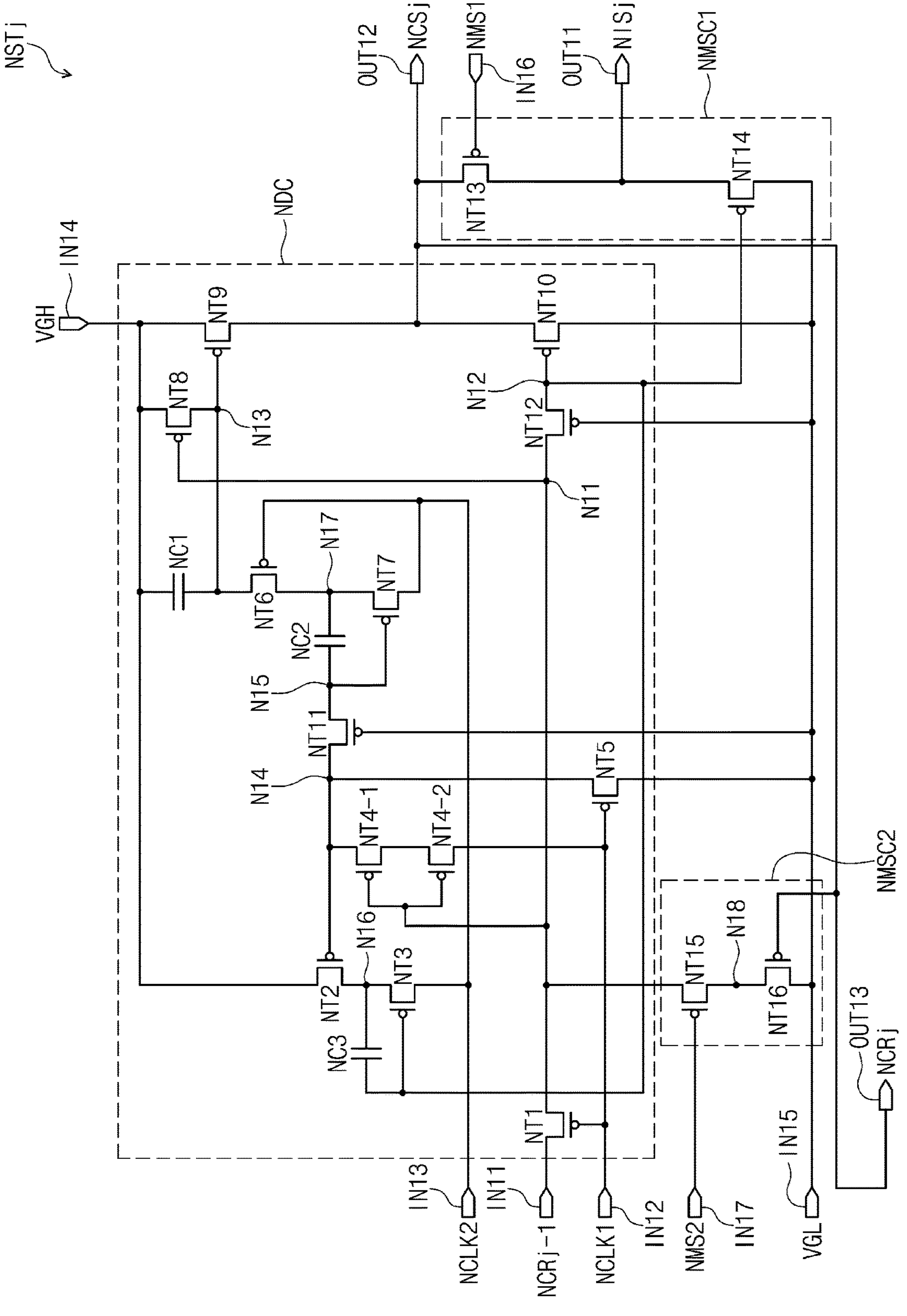
FIG. 8 is a schematic circuit diagram illustrating a j-th driving stage in a first scan driving circuit according to an embodiment.

FIG. 8 is a schematic circuit diagram showing a j-th driving stage NSTj in the first scan driving circuit SD1 according to an embodiment.

FIG. 8 illustrates the j-th driving stage NSTj among the driving stages NST0 to NSTn illustrated in FIG. 5, where j is a positive integer. Each of the driving stages NST0 to NSTn illustrated in FIG. 5 and the j-th driving stage NSTj may have the same circuit. Hereinafter, the j-th driving stage NSTj is referred to as a driving stage NSTj.

Referring to FIG. 8, the driving stage NSTj may include a driving circuit NDC, a first masking circuit NMSC1, a second masking circuit NMSC2, first to seventh input terminals IN11 to IN17, and first to third output terminals OUT11 to OUT13.

The driving circuit NDC may include transistors NT1 to NT12 and capacitors NC1 to NC3. The driving circuit NDC may receive a previous carry signal NCRj−1, the first clock signal NCLK1, the second clock signal NCLK2, the first voltage VGL, and the second voltage VGH through the first to fifth input terminals IN11 to IN15 and may output the first scan signal NISj and the second scan signal NCSj through the first and second output terminals OUT11 and OUT12. The second scan signal NCSj may be output to the third output terminal OUT13 as a carry signal NCRj. The previous carry signal NCRj−1 received through the first input terminal IN11 may be a second scan signal NCSj−1 output from a previous driving stage NSTj−1 illustrated in FIG. 5. The previous carry signal of the driving stage NST0 illustrated in FIG. 5 may be the start signal FLM.

The second input terminal IN12 of each of some driving stages (e.g., odd-numbered driving stages) among the driving stages NST0 to NSTn illustrated in FIG. 5 may receive the first clock signal NCLK1 and the third input terminal IN13 may receive the second clock signal NCLK2. The second input terminal IN12 of each of some driving stages (e.g., even-numbered driving stages) among the driving stages NST0 to NSTn may receive the second clock signal NCLK2, and the third input terminal IN13 may receive the first clock signal NCLK1.

The transistor NT1 may be connected between the first input terminal IN11 and a first node N11 and may include a gate electrode electrically connected to the second input terminal IN12. The transistor NT2 may be connected between the fourth input terminal IN14 and a sixth node N16 and may include a gate electrode electrically connected to a fourth node N14. The transistor NT3 may be connected between the third input terminal IN13 and the sixth node N16 and may include a gate electrode electrically connected to a second node N12.

Transistors NT4-1 and NT4-2 may be connected in series between the fourth node N14 and the second input terminal IN12. Each of the transistors NT4-1 and NT4-2 may include a gate electrode electrically connected to the first node N11. The transistor NT5 may be connected between the fifth input terminal IN15 and the fourth node N14 and may include a gate electrode electrically connected to the second input terminal IN12. The transistor NT6 may be connected between a third node N13 and a seventh node N17 and may include a gate electrode electrically connected to the third input terminal IN13. The transistor NT7 may be connected between the third input terminal IN13 and the seventh node N17 and may include a gate electrode electrically connected to a fifth node N15.

The transistor NT8 may be connected between the fourth input terminal IN14 and the third node N13 and may include a gate electrode electrically connected to the first node N11. The transistor NT9 may be connected between the fourth input terminal IN14 and the second output terminal OUT2 and may include a gate electrode electrically connected to the third node N13. The transistor NT10 may be connected between the second output terminal OUT2 and the fifth input terminal IN15 and may include a gate electrode electrically connected to the second node N12. The transistor NT11 may be connected between the fourth node N14 and the fifth node N15 and may include a gate electrode electrically connected to the fifth input terminal IN15. The transistor NT12 may be connected between the first node N11 and the second node N12 and may include a gate electrode electrically connected to the fifth input terminal IN15.

The capacitor NC1 may be connected between the fourth input terminal IN14 and the third node N13. The capacitor NC2 may be connected between the fifth node N15 and the seventh node N17. The capacitor NC3 may be connected between the sixth node N16 and the second node N12.

The first masking circuit NMSC1 may include the sixth input terminal IN16 and the transistors NT13 and NT14. The first masking circuit NMSC1 may stop (or mask) the output of the first scan signal NISj in response to the first masking signal NMS1 received through the sixth input terminal IN16.

A transistor NT13 may be connected between the second output terminal OUT12 and the first output terminal OUT11 and may include a gate electrode electrically connected to the sixth input terminal IN16. A transistor NT14 may be connected between the first output terminal OUT11 and the fifth input terminal IN15 and may include a gate electrode electrically connected to the second node N12.

The second masking circuit NMSC2 may include the seventh input terminal IN17 and transistors NT15 and NT16. The second masking circuit NMSC2 may stop (or mask) the output of the second scan signal NCSj by discharging the first node N11 in response to the second masking signal NMS2 received through the seventh input terminal IN17.

The transistor NT15 may be connected between the first node N11 and an eighth node N18 and may include a gate electrode electrically connected to the seventh input terminal IN17. The transistor NT16 may be connected between the fifth input terminal IN15 and the eighth node IN18 and may include a gate electrode electrically connected to the second output terminal OUT12.

Figure 9:
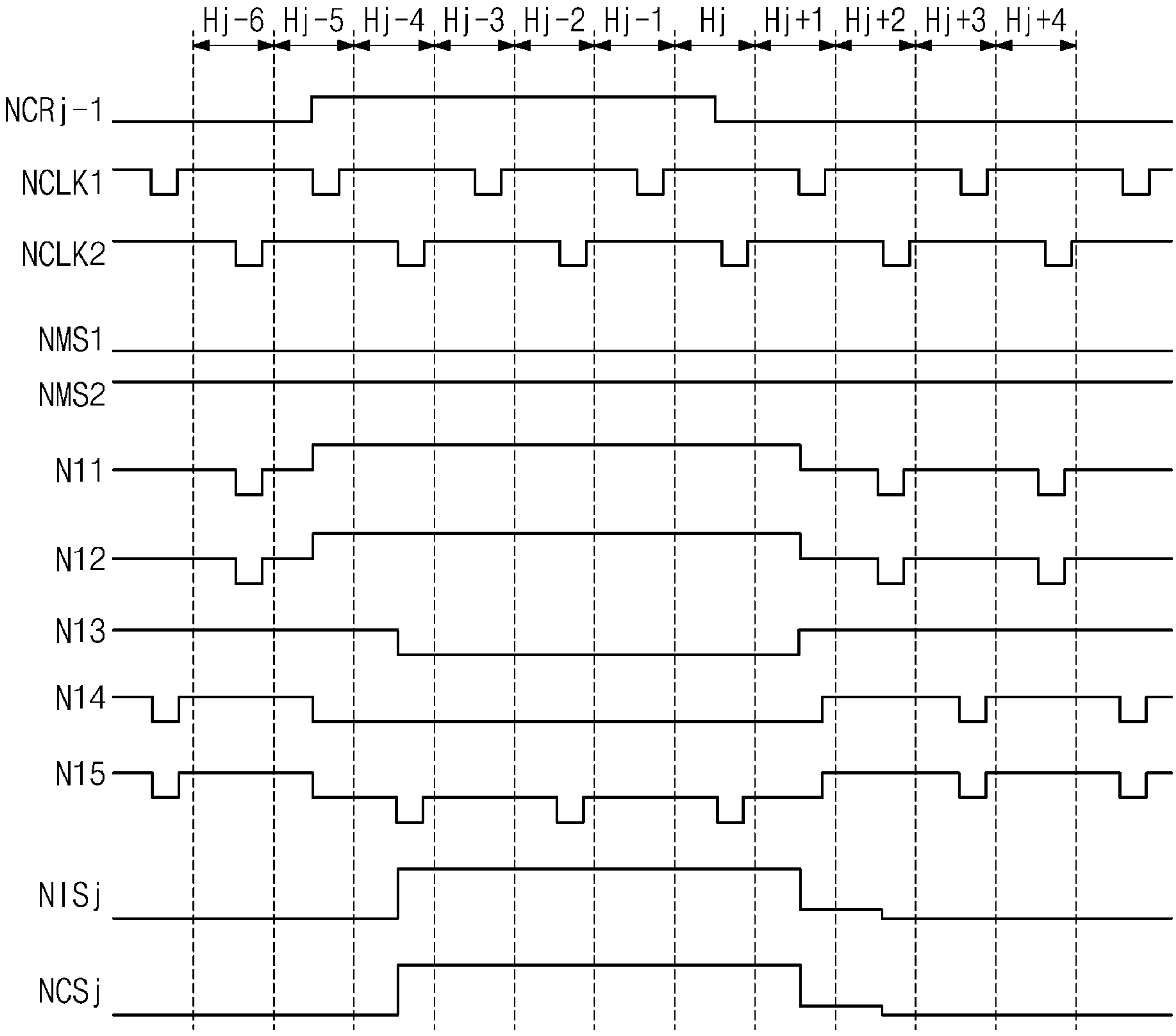
FIG. 9 is a schematic timing diagram illustrating the operation of the j-th driving stage in the first scan driving circuit illustrated in FIG. 8 in a normal mode.

FIG. 9 is a schematic timing diagram showing the operation of the j-th driving stage NSTj in the first scan driving circuit SD1 illustrated in FIG. 8 in a normal mode.

Referring to FIGS. 8 and 9, the first clock signal NCLK1 and the second clock signal NCLK2 may be signals which have the same frequency and transition to an active level (e.g., a low level) in different horizontal sections as an example, Hj−6 to Hj+4. Each of the horizontal section Hj−6 to Hj+4 may be a time period during which the pixels PX in a row in the first direction DR1 of the display panel DP (see FIG. 2) are driven.

During the normal mode N-MODE, the first masking signal NMS1 may be maintained at a first level (e.g., low level), and the second masking signal NMS2 may be maintained at a second level (e.g., high level).

Since the transistor NT13 in the first masking circuit NMSC1 is maintained to be in the state of being turned on by the first masking signal NMS1 of a low level during the normal mode N-MODE, the first output terminal OUT11 and the second output terminal OUT12 may be maintained to be in the state of being electrically connected.

Since the transistor NT15 in the second masking circuit NMSC2 is maintained to be in the state of being turned off by the second masking signal NMS2 of a high level during the normal mode N-MODE, the first node N11 and the eighth node N18 may be maintained to be in the state of being electrically separated.

In case that the first clock signal NCLK1 is at a low level in a j−5-th horizontal section Hj−5, the transistor NT1 may be turned on. As the transistor NT1 is turned on, the first node N11 and the second node N12 may rise to the voltage level (e.g., about 8 V) of the previous carry signal NCRj−1. In case that the first clock signal NCLK1 is at a low level, the transistor NT5 may be turned on, so that the fourth node N14 and the fifth node N15 are discharged to a low level (e.g., about −6 V) of the first voltage VGL. As the voltage level of the first node N11 rises, the transistor NT8 may be turned off.

In case that the second clock signal NCLK2 transitions to a low level in a j−4-th horizontal section Hj−4, the transistor NT6 may be turned on to discharge charges of the third node N13 to the third input terminal IN13 through the transistors NT6 and NT7, so that the signal of the third node N13 transitions to a low level. As the signal of the third node N13 transitions to a low level, the transistor NT9 may be turned on, so that the first scan signal NISj and the second scan signal NCSj of a high level may be output through the first and second output terminals OUT11 and OUT12.

The previous carry signal NCRj−1 may transition from a high level to a low level in a j-th horizontal section Hj, and then the transistor NT1 may be turned on in case that the first clock signal NCLK1 is at a low level in a j+1-th horizontal section Hj+1, so that the first node N11 and the second node N12 are lowered to the voltage level of the previous carry signal NCRj−1 (e.g., about −6 V). As the transistor NT10 and the transistor NT14 are turned on in response to a signal of the second node N12, the first scan signal NISj and the second scan signal NCSj of a low level (e.g., about −6 V) may be output.

As the second clock signal NCLK2 becomes a low level in a j+2-th horizontal section Hj+2, the transistor NT3 may be turned on, so that the second node N12 is lowered to a lower voltage level (e.g., about −15 V) and the first scan signal NISj and the second scan signal NCSj may be lowered to the level (e.g., about −8 V) of the first voltage VGL.

Figure 10:
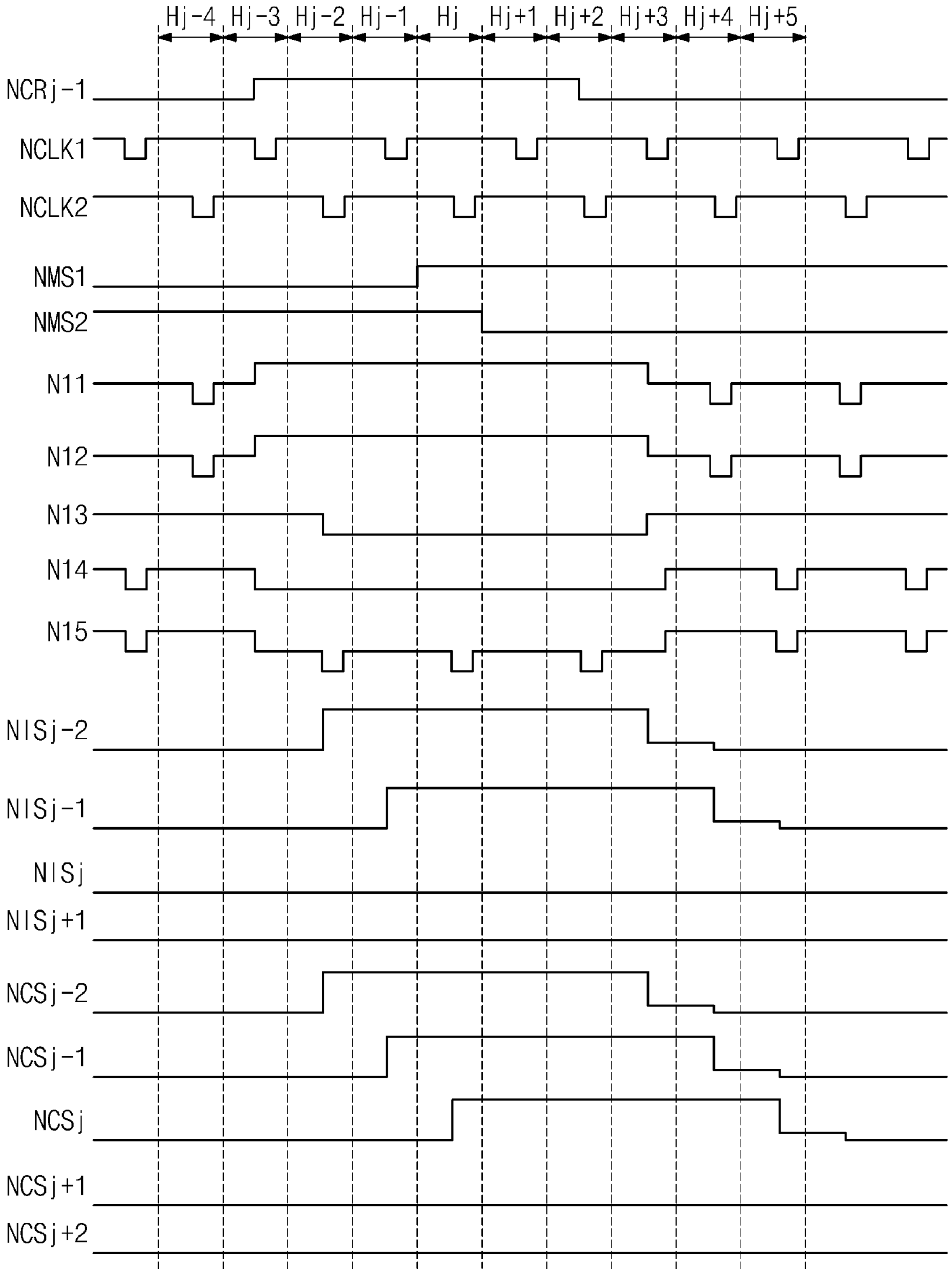
FIG. 10 is a schematic timing diagram illustrating the operation of the j-th driving stage in the first scan driving circuit illustrated in FIG. 8 in a low power mode.

FIG. 10 is a schematic timing diagram illustrating the operation of the j-th driving stage NSTj in the first scan driving circuit SD1 illustrated in FIG. 8 in a low power mode.

Referring to FIGS. 8 and 10, at the start point of the second display region DA2 (see FIG. 1) which is to be driven at a low frequency in the low power mode L-MODE, the first masking signal NMS1 may be changed from a low level to a high level, and the second masking signal NMS2 may be changed from a high level to a low level. In an embodiment, the first masking signal NMS1 may be first changed from a low level to a high level, and then the second masking signal NMS2 may transition from a high level to a low level after a horizontal section. For example, the first masking signal NMS1 may be first changed from a low level to a high level in the j-th horizontal section Hj, and then the second masking signal NMS2 may transition from a high level to a low level in the j+1-th horizontal section Hj+1. In an embodiment, the first masking signal NMS1 and the second masking signal NMS2 may be simultaneously changed. In an embodiment, the first masking signal NMS1 may be first changed from a low level to a high level, and then the second masking signal NMS2 may transition from a high level to a low level after horizontal sections.

In case that the first masking signal NMS1 transitions to a high level, the transistor NT13 in the first masking circuit NMSC1 may be turned off, so that the first output terminal OUT11 and the second output terminal OUT12 are electrically disconnected (or separated).

First scan signals NISj−2 and NISj−1, which already have transitioned to a high level, may be maintained at a high level by a capacitance component of first scan lines NILj−2 and NILj−1. First scan signals NISj and NISj+1 which have not yet transitioned to a high level may be maintained at a low level.

In case that the second masking signal NMS2 transitions to a low level, the transistor NT15 in the second masking circuit NMSC2 may be turned on, so that the first node N11 and the eighth node N18 are electrically connected. Since the transistor NT16 in the second masking circuit NMSC2 operates in response to the second scan signal NCSj, the second scan signals NCSj−2, NCSj−1, and NCSj, which have already transitioned to a high level, may be maintained at a high level even in case that the second masking signal NMS2 has transitioned to a low level.

A second scan signal NCSj+1 of a low level, which has not yet transitioned to a high level, may turn on the transistor NT16 of the second masking circuit NMSC2 in a driving stage NSTj+1, so that the first node N11 may be discharged to the first voltage VGL. Even in case that the previous carry signal NCRj (that is, the second scan signal NCSj) input to the following driving stage NSTj+1 transitions to a high level, the first node N11 may be discharged to the first voltage VGL, so that the first node N11 and the second node N12 may be maintained at a low level. As the second node N12 is maintained at a low level, the transistor NT10 may be turned on, so that the second scan signal NCSj+1 is output at a low level.

A driving stage NSTj+2 may receive a previous carry signal NCRj+1 (that is, the second scan signal NCSj+1) of a low level, so that a second scan signal NCSj+2 is output at a low level.

Referring back to FIG. 3, the pixel PXij may be electrically connected to the first scan line NILj−1 and the second scan line NCLj. For example, the pixel PXij in a j-th row may be connected to the j−1-th first scan line NILj−1 and the j-th second scan line NCLj. In case that pixels in the j-th row are to be driven at a normal frequency and pixels in a j+1-th row and in rows thereafter are to be driven at a low frequency, the j−1-th first scan signal NISj−1 and the j-th second scan signal NCSj should be output at the normal frequency.

In another embodiment, the gate electrode of the fourth transistor T4 in the pixel PXij illustrated in FIG. 3 may be electrically connected to a first scan line NILj−4, and the gate electrode of the third transistor T3 may be electrically connected to the second scan line NCLj. In case that pixels in the j-th row are to be driven at a normal frequency and pixels in the j+l-th row and in rows thereafter are to be driven at a low frequency, a j−4-th first scan signal NISj−4 and the j-th second scan signal NCSj should be output at the normal frequency. In this case, the driving controller 100 illustrated in FIG. 2 may first change the first masking signal NMS1 from a low level to a high level in the j-th horizontal section Hj and may change the second masking signal NMS2 from a high level to a low level in a j+4-th horizontal section Hj+4. As described above, depending on the connection relationship between the pixel PXij and the scan lines, the driving controller 100 may set the first masking signal NMS1 and the second masking signal NMS2.

Figure 11:
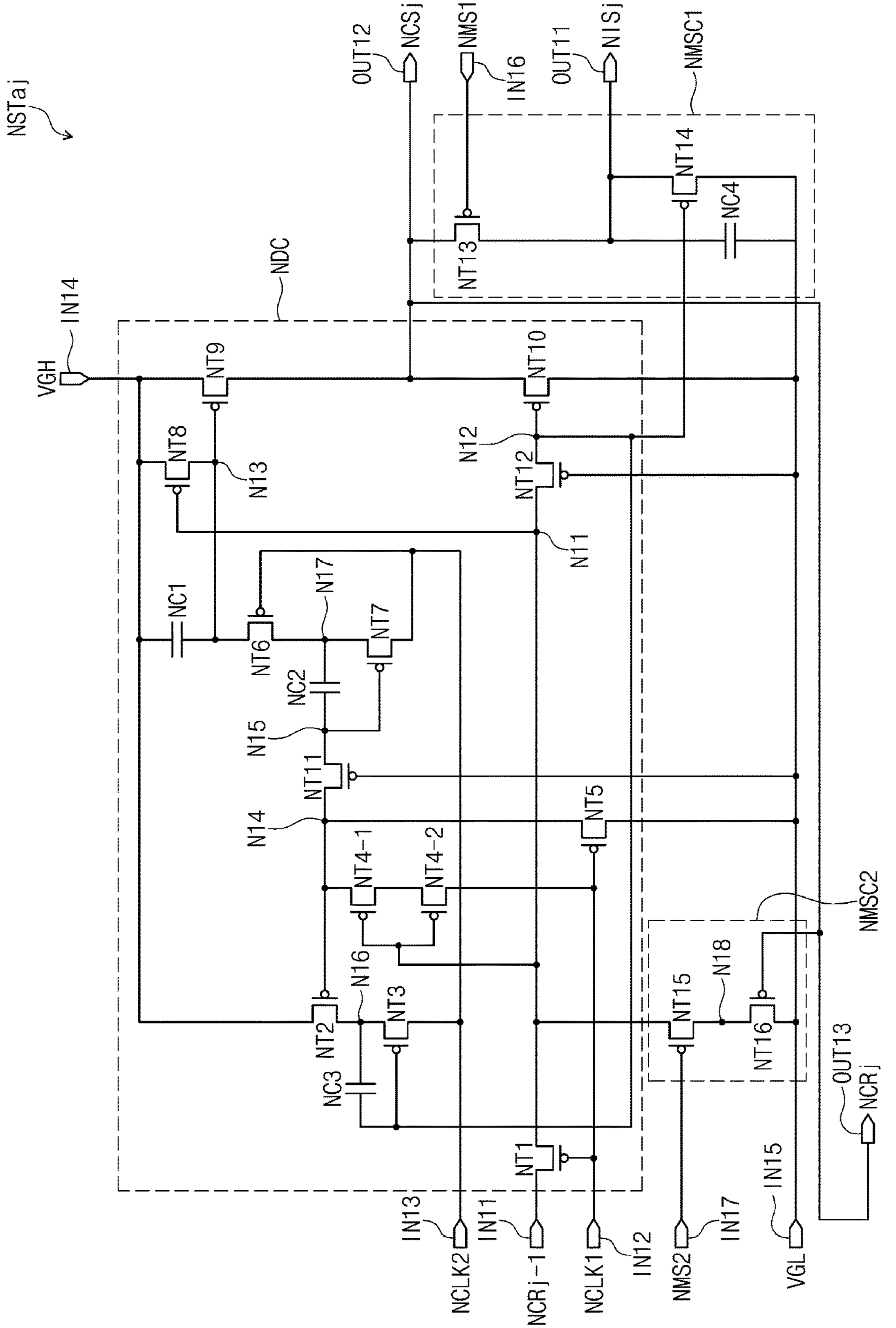
FIG. 11 is a schematic circuit diagram illustrating a j-th driving stage in a first scan driving circuit according to an embodiment.

FIG. 11 is a schematic circuit diagram showing a j-th driving stage NSTaj in the first scan driving circuit SD1 according to an embodiment.

The driving stage NSTaj illustrated in FIG. 11 may have a configuration similar to that of the driving stage NSTj illustrated in FIG. 8 and may further include a capacitor NC4. The capacitor NC4 may be connected between the first output terminal OUT11 and the fifth input terminal IN15.

Referring to FIGS. 10 and 11, in case that the first masking signal NMS1 transitions to a high level in the low power mode L-MODE, the transistor NT13 in the first masking circuit NMSC1 may be turned off, so that the first output terminal OUT11 and the second output terminal OUT12 are electrically disconnected.

The first scan signals NISj−2 and NISj−1, which have already transitioned to a high level, should be maintained at a high level such that pixels in a j−2-th row and pixels in a j−1-th row may display an image. The capacitor NC4 is capable of maintaining the first scan signals NISj−2 and NISj−1 at a high level.

Figure 12:
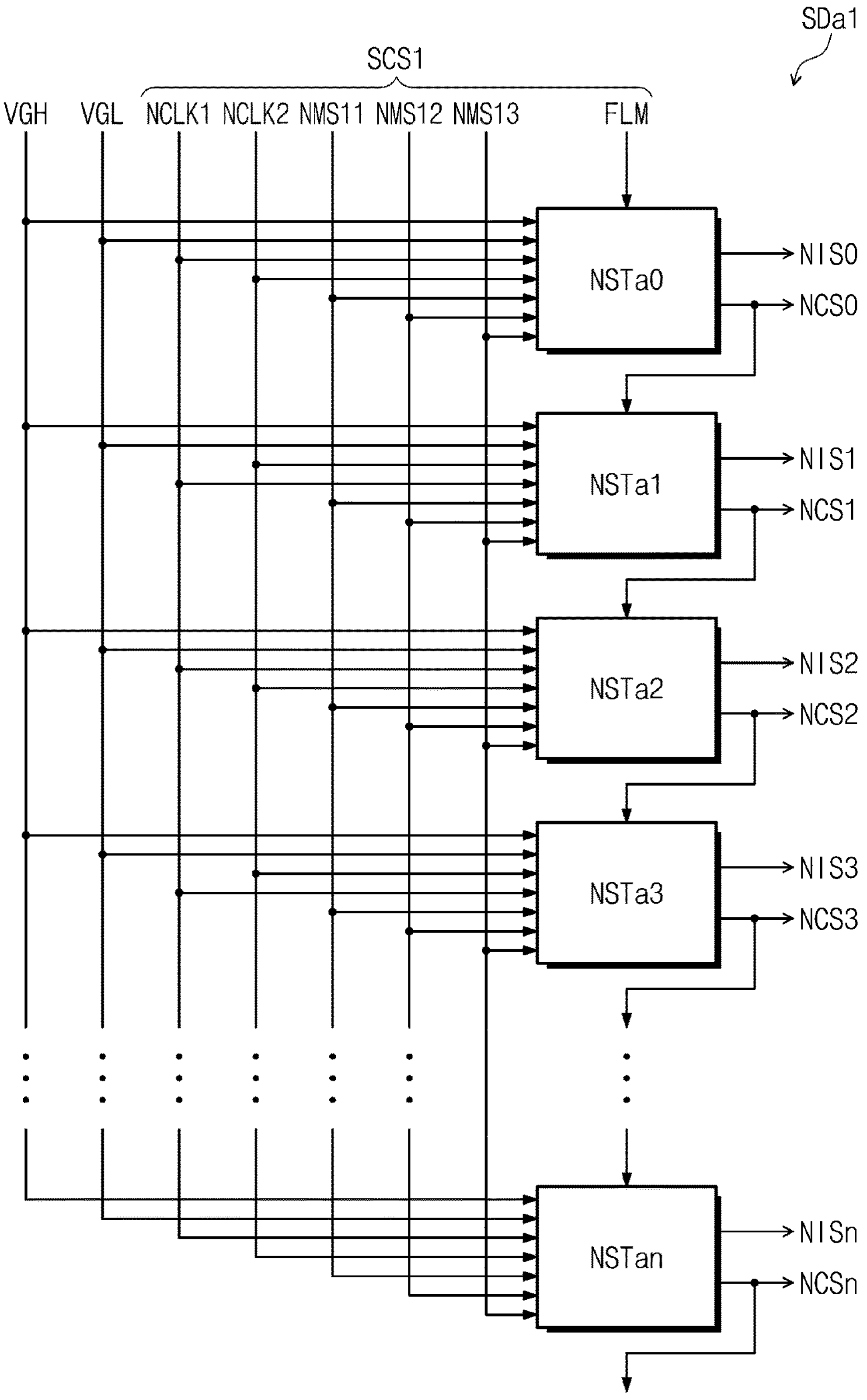
FIG. 12 is a schematic block diagram of a first scan driving circuit according to an embodiment.

FIG. 12 is a schematic block diagram of a first scan driving circuit SDa1 according to an embodiment.

Referring to FIG. 12, the first scan driving circuit SDa1 may include driving stages NSTa0 to NSTan.

Each of the driving stages NSTa0 to NSTan may receive the first scan control signal SCS1 from the driving controller 100 illustrated in FIG. 2. The first scan control signal SCS1 may include the start signal FLM, the first clock signal NCLK1, the second clock signal NCLK2, a first masking signal NMS11, a second masking signal NMS12, and a third masking signal NMS13. Each of the driving stages NSTa0 to NSTan may receive the first voltage VGL and the second voltage VGH. The first voltage VGL and the second voltage VGH may be provided by the voltage generator 300 illustrated in FIG. 2.

The first masking signal NMS11, the second masking signal NMS12, and the third masking signal NMS13 may be signals for driving some of the driving stages NSTa0 to NSTan at a normal frequency and driving the rest thereof at a low frequency.

In an embodiment, the driving stages NSTa0 to NSTan may output the first scan signals NIS0 to NISn and the second scan signals NCS0 to NCSn. The first scan signals NIS0 to NISn−1 may be provided to the first scan lines NIL0 to NILn−1 illustrated in FIG. 2, and the second scan signals NCS1 to NCSn may be provided to the second scan lines NCL1 to NCLn illustrated in FIG. 2.

The driving stage NSTa0 may receive the start signal FLM as a carry signal. Each of the driving stages NSTa1 to NSTan may have a dependent connection relation in which a second scan signal output from a previous driving stage is received as a carry signal. For example, the driving stage NSTa1 may receive the second scan signal NCS0 output from the previous driving stage NSTa0 as a carry signal, and the driving stage NSTa2 may receive the second scan signal NCS1 output from the previous driving stage NSTa1 as a carry signal.

Figure 13:
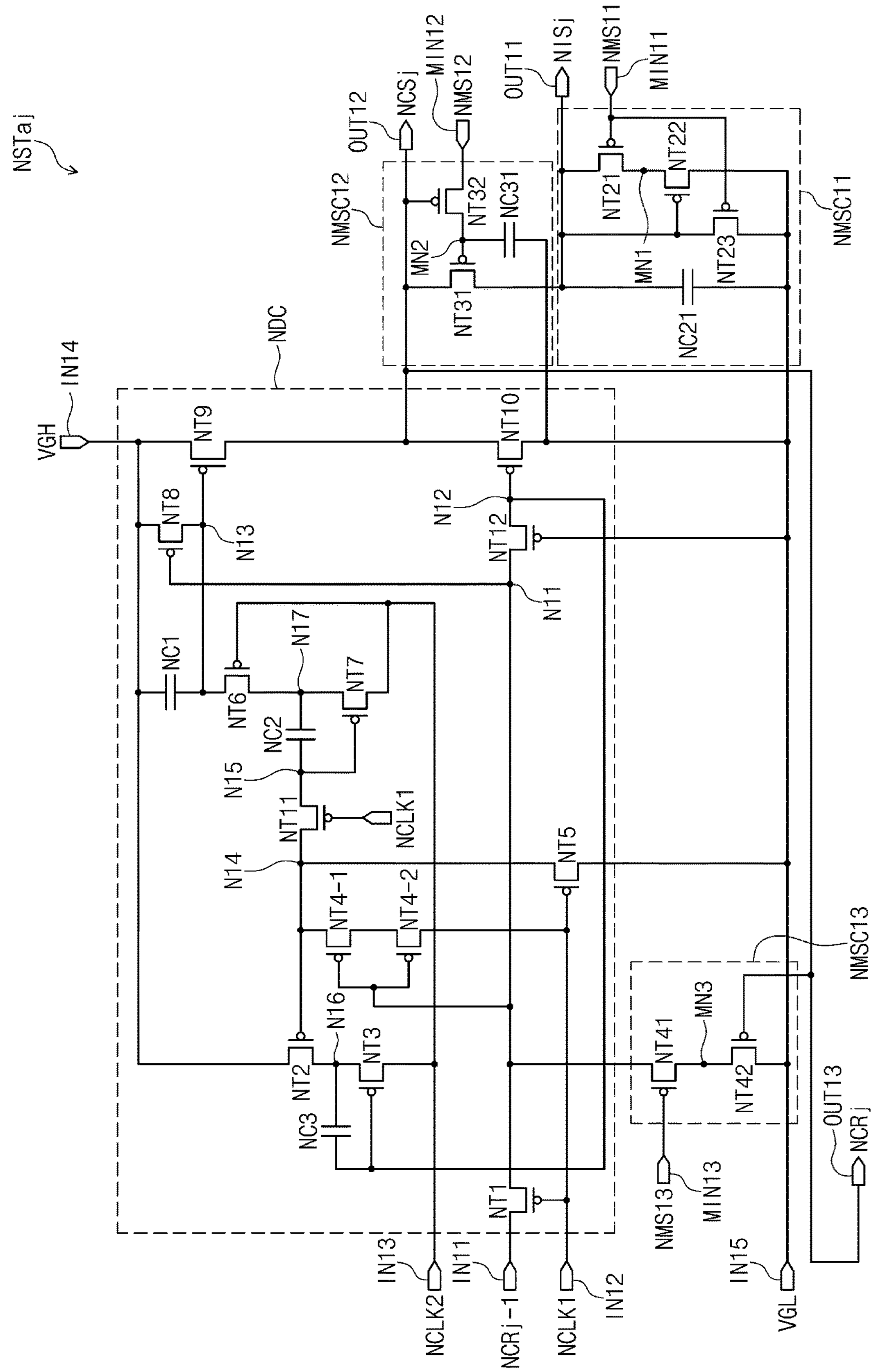
FIG. 13 is a schematic circuit diagram illustrating a j-th driving stage in a first scan driving circuit according to an embodiment.

FIG. 13 is a schematic circuit diagram showing a j-th driving stage NSTaj in the first scan driving circuit SD1 according to an embodiment.

FIG. 13 illustrates the j-th driving stage NSTaj among the driving stages NSTa0 to NSTan illustrated in FIG. 12, where j is a positive integer. Each of the driving stages NSTa0 to NSTan illustrated in FIG. 12 and the j-th driving stage NSTaj may have the same circuit. Hereinafter, the j-th driving stage NSTaj is referred to as a driving stage NSTaj.

Referring to FIG. 13, the driving stage NSTaj may include a driving circuit NDC, a first masking circuit NMSC11, a second masking circuit NMSC12, and a third masking circuit NMSC13.

The driving circuit NDC of the driving stage NSTaj and the driving circuit NDC of the driving stage NSTj illustrated in FIG. 8 may include the same circuit configuration, and thus repetitive descriptions thereof will be omitted.

The first masking circuit NMSC11 may include a first masking input terminal MIN11, a capacitor NC21, and transistors NT21, NT22 and NT23. The first masking circuit NMSC11 may stop (or mask) the output of the first scan signal NISj in response to the first masking signal NMS11 received through the first masking input terminal MIN11.

The transistor NT21 may be connected between the first output terminal OUT11 and a masking node MN1 and may include a gate electrode electrically connected to the first masking input terminal MIN11. The transistor NT22 may be connected between the masking node MN1 and the fifth input terminal IN15 and may include a gate electrode electrically connected to the first output terminal OUT11. The transistor NT23 may be connected between the first output terminal OUT11 and the fifth input terminal IN15 and may include a gate electrode electrically connected to the first masking input terminal MIN11. The capacitor NC21 may be connected between the first output terminal OUT11 and the fifth input terminal IN15.

The second masking circuit NMSC12 may include a second masking input terminal MIN12, a capacitor NC31, and transistors NT31 and NT32. The second masking circuit NMSC12 may stop (or mask) the output of the second scan signal NCSj in response to the second masking signal NMS12 received through the second masking input terminal MIN12.

The transistor NT31 may be connected between the second output terminal OUT12 and the first output terminal OUT11 and may include a gate electrode electrically connected to a masking node MN2. The transistor NT32 may be connected between the masking node MN2 and the second masking input terminal MIN12 and may include a gate electrode electrically connected to the second output terminal OUT12. The capacitor NC31 may be connected between the second masking input terminal MIN12 and the fifth input terminal IN15.

The third masking circuit NMSC13 may include a third masking input terminal MIN13 and transistors NT41 and NT42. The third masking circuit NMSC13 may stop (or mask) the output of the second scan signal NCSj in response to the third masking signal NMS13 received through the third masking input terminal MIN13.

The transistor NT41 may be connected between the first node N11 and a masking node NM3 and may include a gate electrode electrically connected to the third masking input terminal MIN13. The transistor NT42 may be connected between the masking node MN3 and the fifth input terminal IN15 and may include a gate electrode electrically connected to the second output terminal OUT12.

Figure 14:
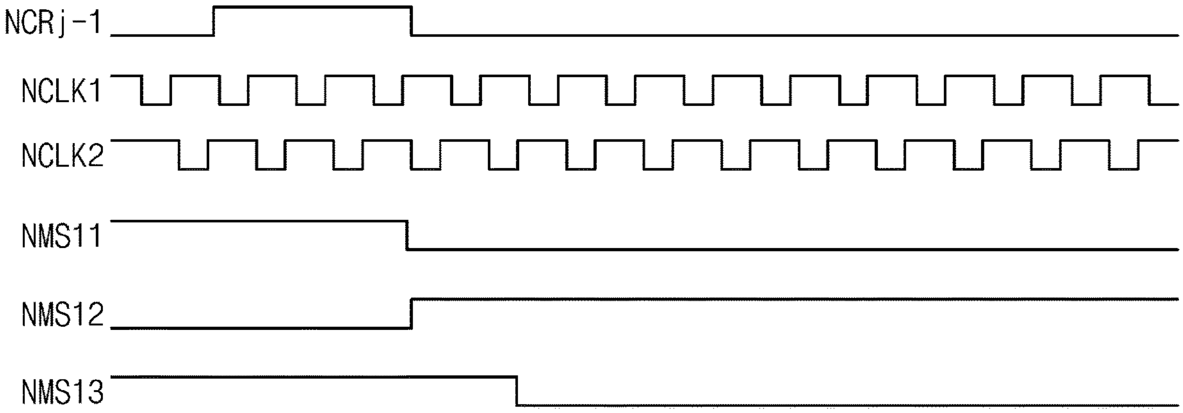
FIG. 14 is a schematic timing diagram exemplarily showing the operation of the j-th driving stage in the first scan driving circuit illustrated in FIG. 13.

FIG. 14 is a schematic timing diagram illustrating the operation of the j-th driving stage NSTaj in the first scan driving circuit SDa1 illustrated in FIG. 12.

Referring to FIGS. 13 and 14, while being operated at a normal frequency, the second masking signal NMS12 may be maintained at a first level (e.g., low level), and the first masking signal NMS11 and the third masking signal NMS13 may be maintained at a second level (e.g., high level).

The transistors NT21 and NT23 in the first masking circuit NMSC11 may be maintained to be in the state of being turned off by the first masking signal NMS11 of a high level.

While the second masking signal NMS12 is at a low level, the transistor NT31 in the second masking circuit NMSC12 may be turned on or off according to the second scan signal NCSj. For example, in case that the second scan signal NCSj is at a low level, the transistors NT31 and NT32 may be turned on, and in case that the second scan signal NCSj is at a high level, the transistors NT32 may be turned off, and the transistor NT31 may be maintained to be in the state of being turned on by the capacitor NC31.

The transistors NT41 in the third masking circuit NMSC13 may be maintained to be in the state of being turned off by the third masking signal NMS13 of a high level. Therefore, a signal level of the second scan signal NCSj may be determined according to the previous carry signal.

In case that the first masking signal NMS11 transitions to a low level, the transistors NT21 and NT23 in the first masking circuit NMSC11 may be turned on. Therefore, the first scan signal NISj may be discharged to the first voltage VGL. If the first scan signal NISj is at a high level at the time when the first masking signal NMS11 transitions to a low level, the transistor NT22 may be turned off, and the first scan signal NISj may be maintained at a high level by the capacitor NC21.

If the second scan signal NCSj is at a low level in case that the second masking signal NMS12 transitions to a high level, the transistor NT32 may be turned on, and the transistor NT31 may be turned off. If the second scan signal NCSj is at a high level in case that the second masking signal NMS12 transitions to a high level, the transistor NT32 may be turned off, and even if the transistor NT31 is maintained to be in the state of being turned off by the capacitor NC31, the second scan signal NCSj may be maintained at a high level by the capacitor NC31. In case that the second scan signal NCSj transitions from a high level back to a low level, the transistor NT32 may be turned on, and the transistor NT31 may be turned off.

In case that the third masking signal NMS13 transitions to a low level, the transistor NT41 may be turned on, and the transistor NT42 may be turned on or off according to the second scan signal NCSj. If the second scan signal NCSj is at a high level, the transistor NT42 may be turned off, so that the voltage level of the first node N11 is maintained. In contrast, if the second scan signal NCSj is at a low level in case that the third masking signal NMS13 transitions to a low level, the transistor NT42 may be turned on, so that the first node N11 may be discharged to the first voltage VGL.

As described with reference to FIGS. 3 and 10, the pixel PXij may be electrically connected to the first scan line NILj−1 and the second scan line NCLj. For example, the pixel PXij of a j-th row may be electrically connected to the j−1-th first scan line NILj−1 and the j-th second scan line NCLj. In case that pixels of the j-th row are to be driven at a normal frequency and pixels of the j+l-th row and rows thereafter are to be driven at a low frequency, a j−1-th first scan signal NISj−1 and the j-th second scan signal NCSj should be output at the normal frequency.

Accordingly, the first masking signal NMS11 may be changed from a high level to a low level, the second masking signal NMS12 may be changed from a low level to a high level, and then the third masking signal NMS13 may be changed from a high level to a low level after a horizontal section.

Figure 15:
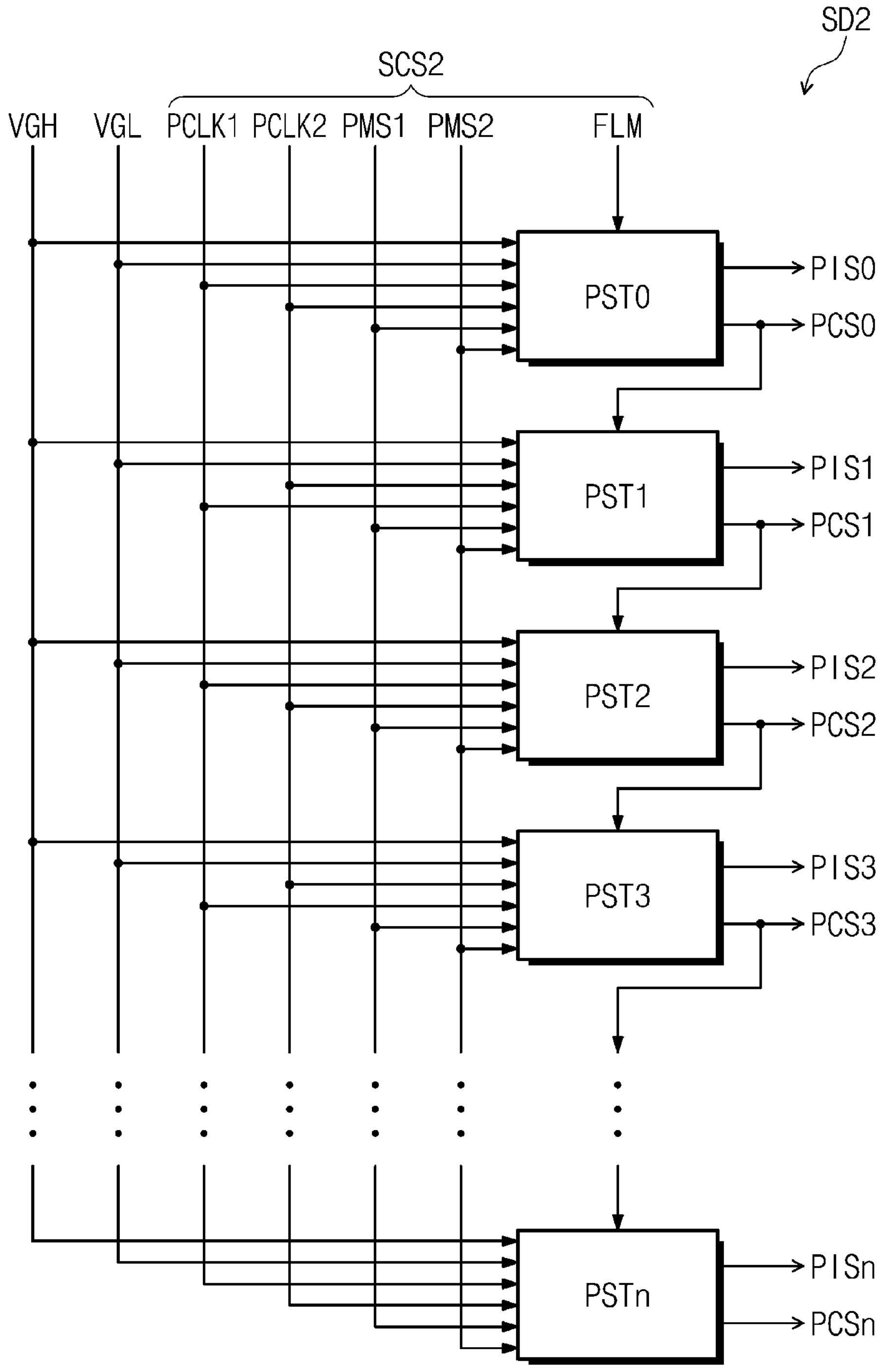
FIG. 15 is a schematic block diagram of a second scan driving circuit according to an embodiment.

FIG. 15 is a schematic block diagram of the second scan driving circuit SD2 according to an embodiment.

Referring to FIG. 15, the second scan driving circuit SD2 may include driving stages PST0 to PSTn.

Each of the driving stages PST0 to PSTn may receive the second scan control signal SCS2 from the driving controller 100 illustrated in FIG. 2. The second scan control signal SCS2 may include the start signal FLM, a first clock signal PCLK1, a second clock signal PCLK2, a first masking signal PMS1, and a second masking signal PMS2. Each of the driving stages PST0 to PSTn may receive the first voltage VGL and the second voltage VGH. The first voltage VGL and the second voltage VGH may be provided by the voltage generator 300 illustrated in FIG. 2.

The first masking signal PMS1 and the second masking signal PMS2 may be signals for driving some of the driving stages PST0 to PSTn at a normal frequency and driving the rest thereof at a low frequency.

In an embodiment, the driving stages PST0 to PSTn may output third scan signals PIS0 to PISn and fourth scan signals PCS0 to PCSn. The third scan signals PIS0 to PISn−1 may be provided to the third scan lines PIL0 to PILn−1 illustrated in FIG. 2, and the fourth scan signals PCS1 to PCSn may be provided to the fourth scan lines PCL1 to PCLn illustrated in FIG. 2.

The driving stage PST0 may receive the start signal FLM as a carry signal. Each of the driving stages PST1 to PSTn may have a dependent connection relation in which a fourth scan signal output from a previous driving stage is received as a carry signal. For example, the driving stage PST1 may receive the fourth scan signal PCS0 output from the previous driving stage PST0 as a carry signal, and the driving stage PST2 may receive the fourth scan signal PCS1 output from the previous driving stage PST1 as a carry signal.

Figure 16:
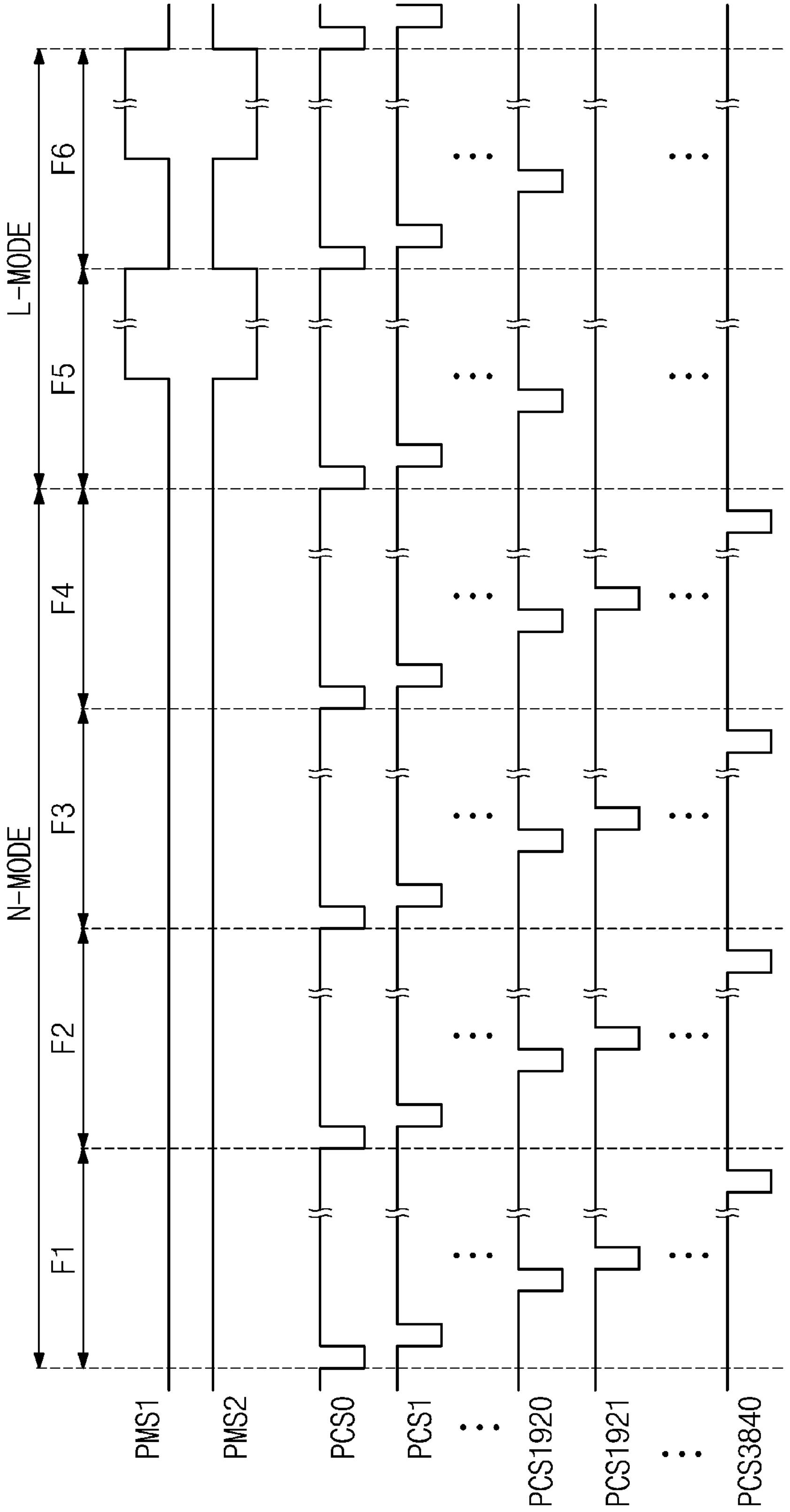
FIG. 16 is a schematic timing diagram illustrating fourth scan signals output from the second scan driving circuit illustrated in FIG. 15 in a normal mode and a low power mode.

FIG. 16 is a schematic diagram showing the fourth scan signals PCS0 to PCSn output from the second scan driving circuit SD2 illustrated in FIG. 15 in a normal mode and a low power mode.

Referring to FIGS. 15 and 16, during a normal mode N-MODE, the first masking signal PMS1 may be maintained at a first level (e.g., low level), and the second masking signal PMS2 may be maintained at a second level (e.g., high level).

During the normal mode N-MODE, the driving stages PST0 to PSTn may sequentially output the fourth scan signals PCS0 to PCSn at a low level in each of the frames F1, F2, F3, and F4.

The first masking signal PMS1 may be changed from a low level to a high level at the start point of the second display region DA2 (see FIG. 1) which is driven at a low frequency during the low power mode L-MODE, and the second masking signal PMS2 may be changed from a high level to a low level.

For example, when the low power mode L-MODE starts from a fifth frame F5, the first image IM1 as illustrated in FIG. 1 may be displayed in the first display region DA1, and the second image IM2 may be displayed in the second display region DA2. While the first masking signal PMS1 is maintained at a low level and the second masking signal PMS2 is maintained at a high level at the start point of the fifth frame F5, fourth scan signals PCS0 to PCS1920 may be sequentially driven at a low level. After the first masking signal PMS1 is changed to a high level and the second masking signal PMS2 is changed to a low level in the fifth frame F5, fourth scan signals PCS1921 to PCS3840 may be maintained at a high level. When the fifth frame F5 ends and a sixth frame F6 starts, the first masking signal PMS1 may be changed back to a low level, and the second masking signal PMS2 may be changed back to a high level.

As in the case of the fifth frame F5, while the first masking signal PMS1 is maintained at a low level and the second masking signal PMS2 is maintained at a high level in the sixth frame F6, fourth scan signals PCS0 to PCS1920 may be sequentially driven at a low level. After the first masking signal PMS1 is changed to a high level and the second masking signal PMS2 is changed to a low level in the middle of the sixth frame F6, fourth scan signals PCS1921 to PCS3840 may be maintained to be at a high level.

Figure 17:
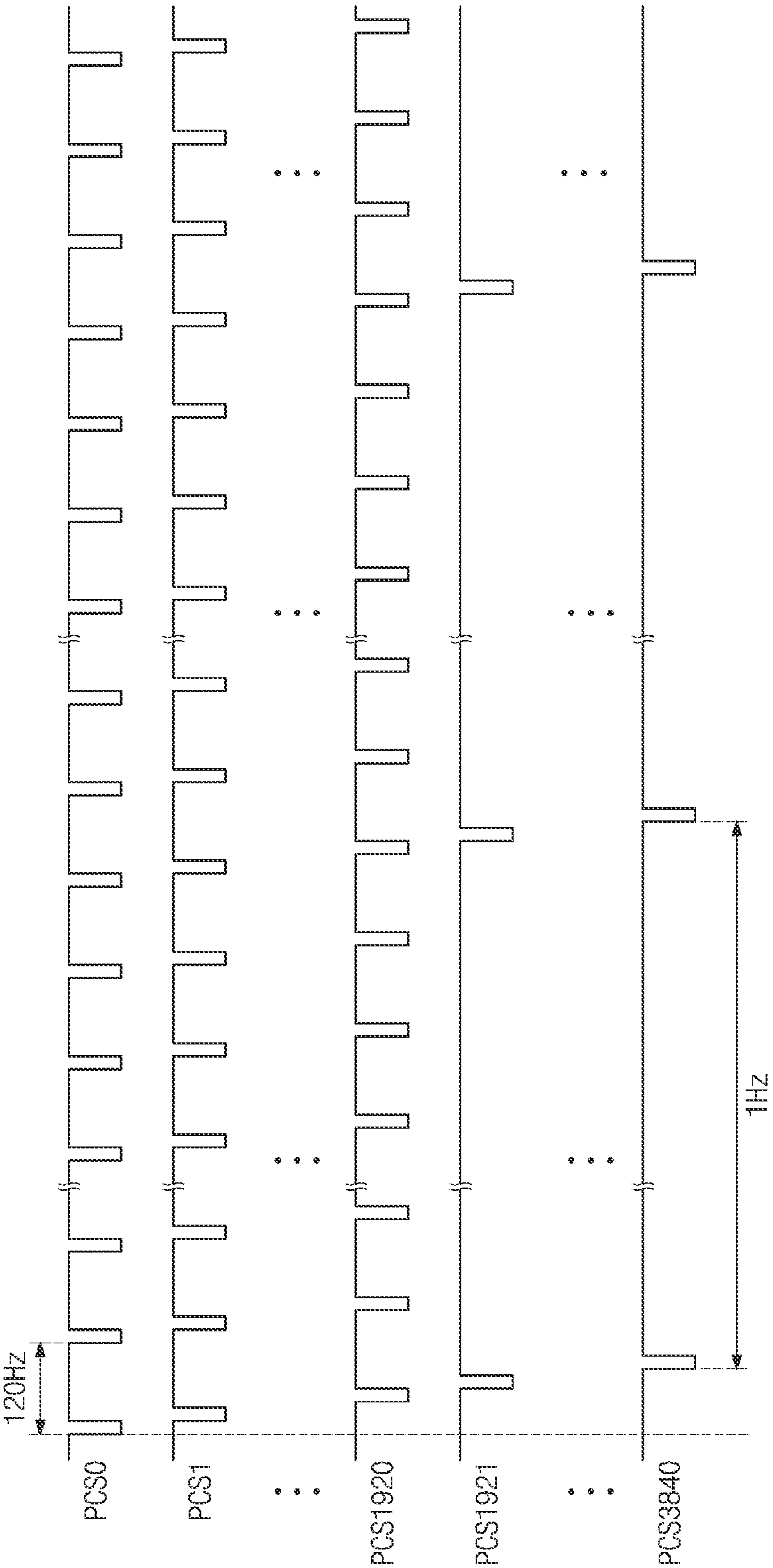
FIG. 17 is a schematic diagram illustrating fourth scan signals in a low power mode.

FIG. 17 is a schematic timing diagram illustrating the fourth scan signals PCS0 to PCSn in a low power mode.

Referring to FIG. 17, in the low power mode, the frequency of the fourth scan signals PCS0 to PCS1920 may be about 120 Hz, and the frequency of the fourth scan signals PCS1921 to PCS3840 may be about 1 Hz. Although not illustrated in the drawings, third scan signals PIS0 to PIS3840 and fourth scan signals PCS0 to PCS3840 may have the same waveform.

For example, the fourth scan signals PCS0 to PCS1920 may correspond to the first display region DA1 of the display device DD illustrated in FIG. 1, and the fourth scan signals PCS1921 to PCS3840 may correspond to the second display region D2. The first display region DA1 in which a moving image is displayed may be driven by the fourth scan signals PCS0 to PCS1920 of a normal frequency (e.g., about 120 Hz), and the second display region DA2 in which a still image is displayed may be driven by the fourth scan signals PCS1921 to PCS3840 of a low frequency (e.g., about 1 Hz). Therefore, since only the second display region DA2 in which a still image is displayed is driven at a low frequency, power consumption may be reduced without the deterioration in display quality.

Figure 18:
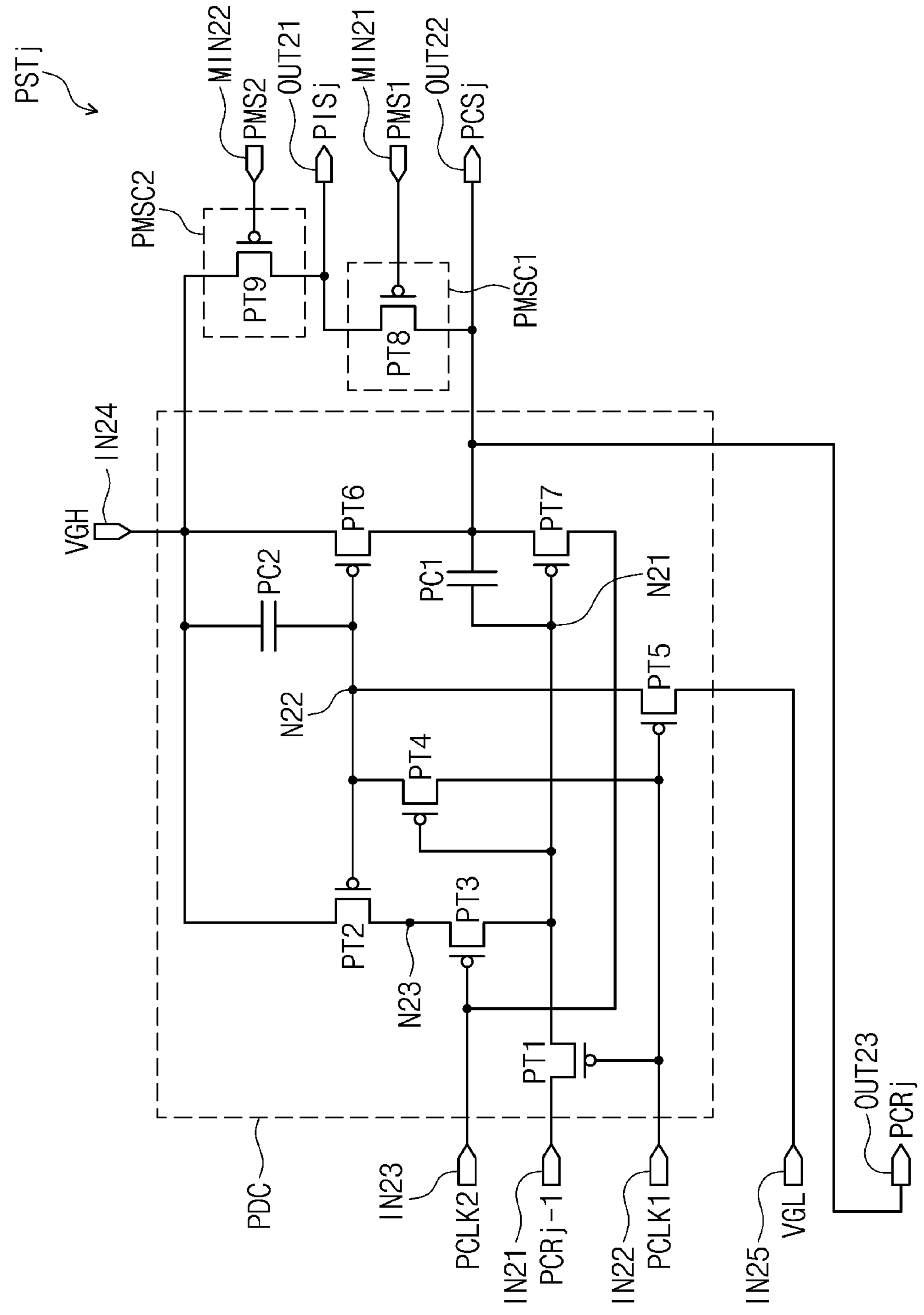
FIG. 18 is a schematic circuit diagram showing a j-th driving stage in a second scan driving circuit according to an embodiment.

FIG. 18 is a schematic circuit diagram showing a j-th driving stage PSTj in the second scan driving circuit SD2 according to an embodiment.

FIG. 18 illustrates the j-th driving stage PSTj among the driving stages PST0 to PSTn illustrated in FIG. 15, where j is a positive integer. Each of the driving stages PST0 to PSTn illustrated in FIG. 15 and the j-th driving stage PSTj may have the same circuit. Hereinafter, the j-th driving stage PSTj is referred to as a driving stage PSTj.

Referring to FIG. 18, the driving stage PSTj may include a driving circuit PDC, a first masking circuit PMSC1, a second masking circuit PMSC2, first to fifth input terminals IN21 to IN25, first and second masking input terminals MIN21 and MIN22, and first to third output terminals OUT21 to OUT23.

The driving circuit PDC may include transistors PT1 to PT7 and capacitors PC1 and PC2.

The driving circuit PDC may receive a previous carry signal PCRj−1, the first clock signal PCLK1, the second clock signal PCLK2, the first voltage VGL, and the second voltage VGH through the first to fifth input terminals IN11 to IN15 and may output a third scan signal PISj and a fourth scan signal PCSj through first and second output terminals OUT21 and OUT22. The fourth scan signal PCSj may be output to the third output terminal OUT23 as a following carry signal PCRj. The previous carry signal PCRj−1 received through the first input terminal IN21 may be a fourth scan signal PCSj−1 output from a previous driving stage PSTj−1 illustrated in FIG. 15. The previous carry signal of the driving stage PST0 illustrated in FIG. 15 may be the start signal FLM.

The second input terminal IN22 of each of some driving stages (e.g., odd-numbered driving stages) among the driving stages PST0 to PSTn illustrated in FIG. 15 may receive the first clock signal PCLK1 and the third input terminal IN23 may receive the second clock signal PCLK2. The second input terminal IN22 of each of some driving stages (e.g., even-numbered driving stages) among the driving stages PST0 to PSTn may receive the second clock signal PCLK2 and the third input terminal IN23 may receive the first clock signal PCLK1.

The transistor PT1 may be connected between the first input terminal IN21 and a first node N21 and may include a gate electrode electrically connected to the second input terminal IN22. The transistor PT2 may be connected between the fourth input terminal IN24 and a third node N23 and may include a gate electrode electrically connected to a second node N22. The transistor PT3 may be connected between a third node N23 and the first node N21 and may include a gate electrode electrically connected to the third input terminal IN23.

The transistor PT4 may be connected between the second node N22 and the second input terminal IN22 and may include a gate electrode electrically connected to the first node N21. The transistor PT5 may be connected between the second node N22 and the fifth input terminal IN25 and may include a gate electrode electrically connected to the second input terminal IN22. The transistor PT6 may be connected between the fourth input terminal IN24 and a second output terminal OUT22 and may include a gate electrode electrically connected to the second node N22. The transistor PT7 may be connected between the second output terminal OUT22 and the third input terminal IN23 and may include a gate electrode electrically connected to the first node N21.

The first masking circuit PMSC1 may include the first masking input terminal MIN21 and a transistor PT8. The first masking circuit PMSC1 may stop (or mask) the output of the third scan signal PISj in response to the first masking signal PMS1 received through the first masking input terminal MIN21. The transistor PT8 may be connected between the first output terminal OUT21 and the second output terminal OUT22 and may include a gate electrode electrically connected to the first masking input terminal MIN21.

The second masking circuit PMSC2 may include the second masking input terminal MIN22 and a transistor PT9. The second masking circuit PMSC2 may mask the output of the third scan signal PISj with a high level in response to the second masking signal PMS2 received through the second masking input terminal MIN22. The transistor PT9 may be connected between the fourth input terminal IN24 and the first output terminal OUT21 and may include a gate electrode electrically connected to the second masking input terminal MIN22.

Figure 19:
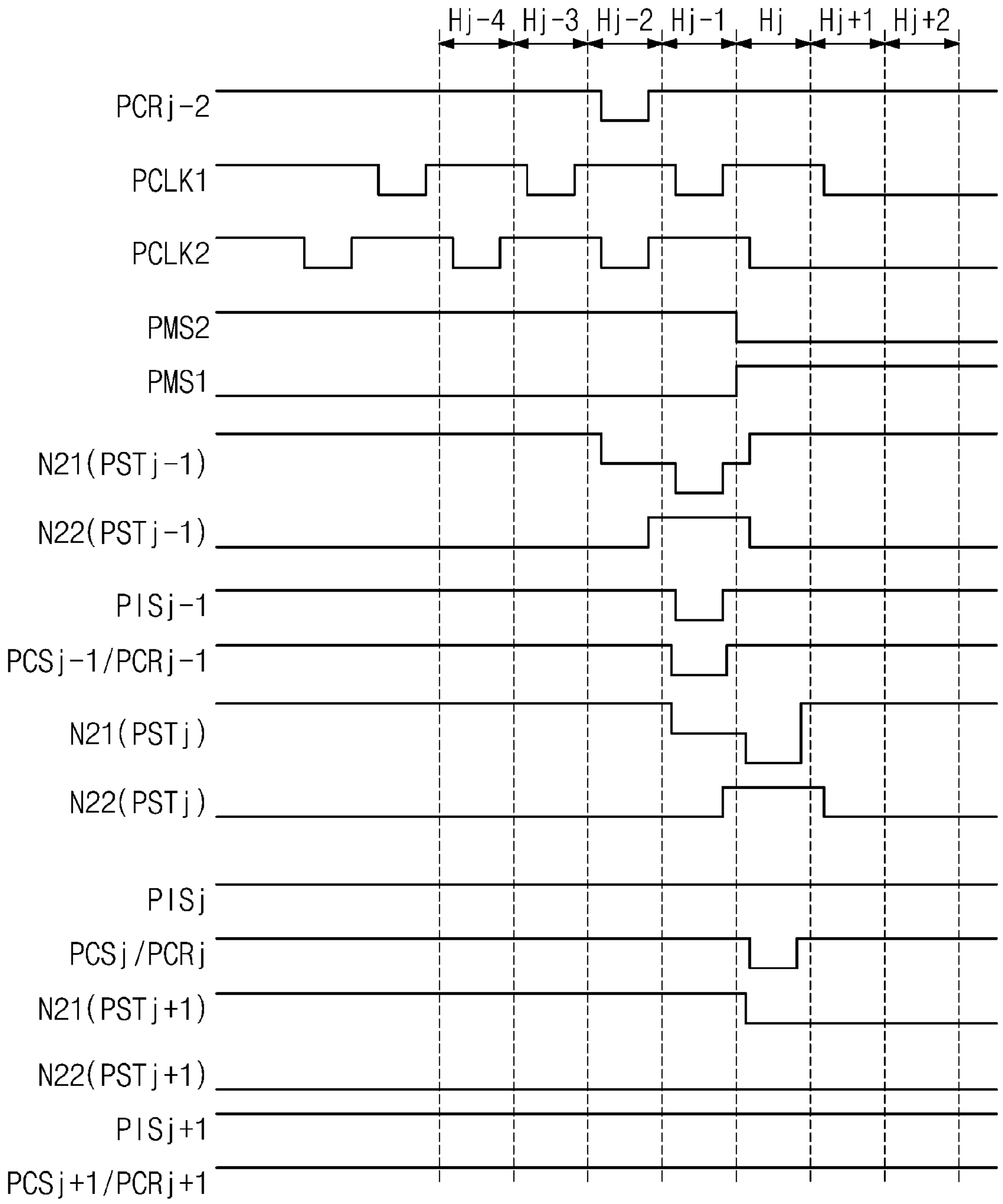
FIG. 19 is a schematic timing diagram illustrating the operation of a j−1-th driving stage, a j-th driving stage, and a j+1-th driving stage in the second scan driving circuit illustrated in FIG. 15.

FIG. 19 is a schematic timing diagram illustrating the operation of the j−1-th driving stage PSTj−1, the j-th driving stage PSTj, and a j+1-th driving stage PSTj+1 in the second scan driving circuit SD2 illustrated in FIG. 15.

Referring to FIGS. 15, 18, and 19, the first clock signal PCLK1 and the second clock signal PCLK2 may be signals which have the same frequency and transition to an active level (e.g., a low level) in different horizontal sections as an example, Hj−4 to Hj+2. Each of the horizontal section Hj−4 to Hj+2 may be a time period during which the pixels PX in a row in the first direction DR1 of the display panel DP (see FIG. 2) are driven.

The first masking signal PMS1 may be maintained at a first level (e.g., a low level), and the second masking signal PMS2 may be maintained at a second level (e.g., a high level) after the start of a frame.

Since the transistor PT8 in the first masking circuit PMSC1 is maintained to be in the state of being turned on by the first masking signal PMS1 of a low level, the first output terminal OUT21 and the second output terminal OUT22 may be maintained to be in the state of being electrically connected.

Since the transistor PT9 in the second masking circuit PMSC2 is maintained to be in the state of being turned off by the second masking signal PMS2 of a high level, the fourth input terminal IN24 and the first output terminal OUT21 may be maintained to be in the state of being electrically separated.

The j−1-th driving stage PSTj−1 may operate as follows.

The j−1-th driving stage PSTj−1 may receive the second clock signal PCLK2 through the second input terminal IN22 and may receive the first clock signal PCLK1 through the third input terminal IN23.

In case that the second clock signal PCLK2 received through the second input terminal IN22 is at a low level in a j−2-th horizontal section Hj−2, the transistor PT1 in the driving circuit PDC may be turned on. As the transistor PT1 is turned on, a previous carry signal PCRj−2 of a low level may be transmitted to the first node N21 through the transistor PT1. In case that the first node N21 is at a low level, the transistor PT7 may be turned on, so that the second output terminal OUT22 is maintained to be at a high level by the first clock signal PCLK1 received through the third input terminal IN23. In case that the second clock signal PCLK2 is at a low level, the transistor PT5 may be turned on. As the transistor PT5 is turned on, the second node N22 may be discharged to the first voltage VGL. In case that the second node N22 is at a low level, the transistor PT6 may be turned on, so that the second output terminal OUT22 may output the fourth scan signal PCSj−1 of a high level.

In case that the first clock signal PCLK1 is at a low level in a j−1-th horizontal section Hj−1, the first node N21 may be changed to a lower level by a capacitor PC1, and the transistor PT7 may be turned on, so that the second output terminal OUT22 may output the fourth scan signal PCSj−1 of a low level. Since the transistor PT8 in the first masking circuit PMSC1 is in the state of being turned on, the third scan signal PISj−1 may be activated at a low level.

In case that the first masking signal PMS1 transitions from a low level to a high level and the second masking signal PMS2 transitions from a high level to a low level in the j−2-th horizontal section Hj−2, the transistor PT8 in the first masking circuit PMSC1 may be turned off, and the transistor PT9 in the second masking circuit PMSC2 may be turned on.

The j-th driving stage PSTj may operate as follows.

The j-th driving stage PSTj may receive the first clock signal PCLK1 through the second input terminal IN22 and may receive the second clock signal PCLK2 through the third input terminal IN23.

In case that the first clock signal PCLK1 received through the first input terminal IN21 is at a low level in the j−1-th horizontal section Hj−1, the transistor PT1 in the driving circuit PDC may be turned on. As the transistor PT1 is turned on, a previous carry signal PCRj−1 of a low level may be transmitted to the first node N21 through the transistor PT1. In case that the first node N21 is at a low level, the transistor PT7 may be turned on, so that the second output terminal OUT22 is maintained to be at a high level by the second clock signal PCLK2 received through the third input terminal IN23. In case that the first clock signal PCLK1 is at a low level, the transistor PT5 may be turned on. As the transistor PT5 is turned on, the second node N22 may be discharged to the first voltage VGL. In case that the second node N22 is at a low level, the transistor PT6 may be turned on, so that the second output terminal OUT22 may output the fourth scan signal PCSj of a high level.

In case that the second clock signal PCLK2 is at a low level in the j-th horizontal section Hj, the first node N21 may be changed to a lower level by the capacitor PC1, and the transistor PT7 may be turned on, so that the second output terminal OUT22 may output the fourth scan signal PCSj of a low level. Since the transistor PT8 in the first masking circuit PMSC1 is in the state of being turned off and the transistor PT9 in the second masking circuit PMSC2 is in the state of being turned on, the third scan signal PISj may be maintained at a high level.

The j+1-th driving stage PSTj+1 may operate as follows.

The j+1-th driving stage PSTj+1 may receive the second clock signal PCLK2 through the second input terminal IN22 and may receive the first clock signal PCLK1 through the third input terminal IN23.

In case that the second clock signal PCLK2 is at a low level in the j+1-th horizontal section Hj+1, the transistor PT1 in the driving circuit PDC may be turned on. As the transistor PT1 is turned on, the previous carry signal PCRj of a low level may be transmitted to the first node N21 through the transistor PT1, so that the transistor PT4 is turned on. In case that the second clock signal PCLK2 is at a low level, the transistor PT5 may be turned on, so that the second node N22 is discharged to the first voltage VGL.

Since the second node N22 is at a low level, the transistor PT6 may be maintained to be in the state of being turned on, so that the second output terminal OUT22 may output the fourth scan signal PCSj+1 of a high level. In case that the transistor PT8 in the first masking circuit PMSC1 is in the state of being turned off and the transistor PT9 in the second masking circuit PMSC2 is in the state of being turned on, the third scan signal PISj+1 may be maintained at a high level.

Referring to FIGS. 3 and 19, the pixel PXij may be electrically connected to the third scan line PILj−1 and the fourth scan line PCLj. For example, the pixel PXij in the j-th row may be electrically connected to the j−1-th third scan line PILj−1 and the j-th fourth scan line PCLj. In case that pixels in the j-th row are to be driven at a normal frequency and pixels in the j+1-th row and in rows thereafter are to be driven at a low frequency, a j−1-th third scan signal PISj−1 and a j-th fourth scan signal PCSj should be output at the normal frequency.

Accordingly, when changed from the first display region DA1 to the second display region DA2, the first masking signal PMS1 may be changed from a low level to a high level, and the second masking signal PMS2 may be changed from a high level to a low level to mask the j-th third scan signal PISj to a high level. Thereafter, by maintaining the first clock signal PCLK1 and the second clock signal PCLK2 at a low level, a j+1-th fourth scan signal PCSj+1 may be masked to a high level.

Figure 20:
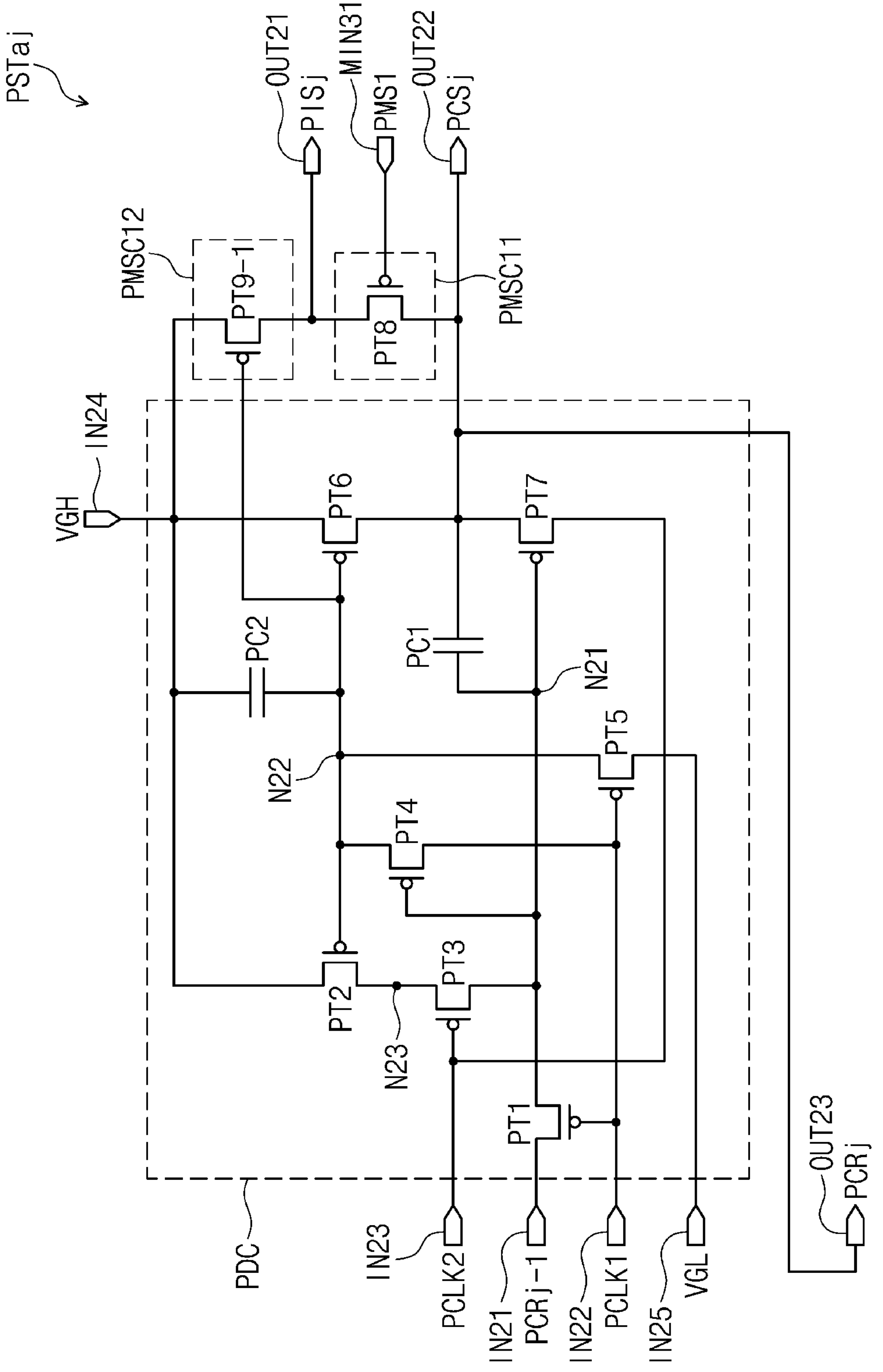
FIG. 20 is a schematic circuit diagram illustrating a j-th driving stage in a second scan driving circuit according to an embodiment.

FIG. 20 is a schematic circuit diagram showing a j-th driving stage PSTaj in the second scan driving circuit SD2 according to an embodiment.

While the driving stage PSTaj illustrated in FIG. 20 has a configuration similar to that of the driving stage PSTj illustrated in FIG. 18, a gate electrode of a transistor PT9-1 in a second masking circuit PMSC12 may be electrically connected to the second node N22. A first masking circuit PMSC11 and the first masking circuit PMSC1 illustrated in FIG. 18 may have the same circuit configuration. The first masking signal PMS1 received through a masking input terminal MIN31 of the first masking circuit PMSC11 and the first masking signal PMS1 received through the first masking input terminal MIN21 of the first masking circuit PMSC1 illustrated in FIG. 18 may have the same waveform.

Referring to FIGS. 19 and 20, since the first clock signal PCLK1 and the second clock signal PCLK2 corresponding to the second display region DA2 in the low power mode L-MODE are at a low level, the second node N22 may be maintained at a low level. Therefore, the transistor PT9-1 in the second masking circuit PMSC12 of stages corresponding to the second display region DA2 may be maintained to be in the state of being turned on. As a result, the third scan signal PISj may be masked to a high level. As the second node N22 is maintained at a low level, the transistor PT6 may be maintained to be in the state of being turned on, so that the fourth scan signal PCSj may be masked to a high level.

Figure 21:
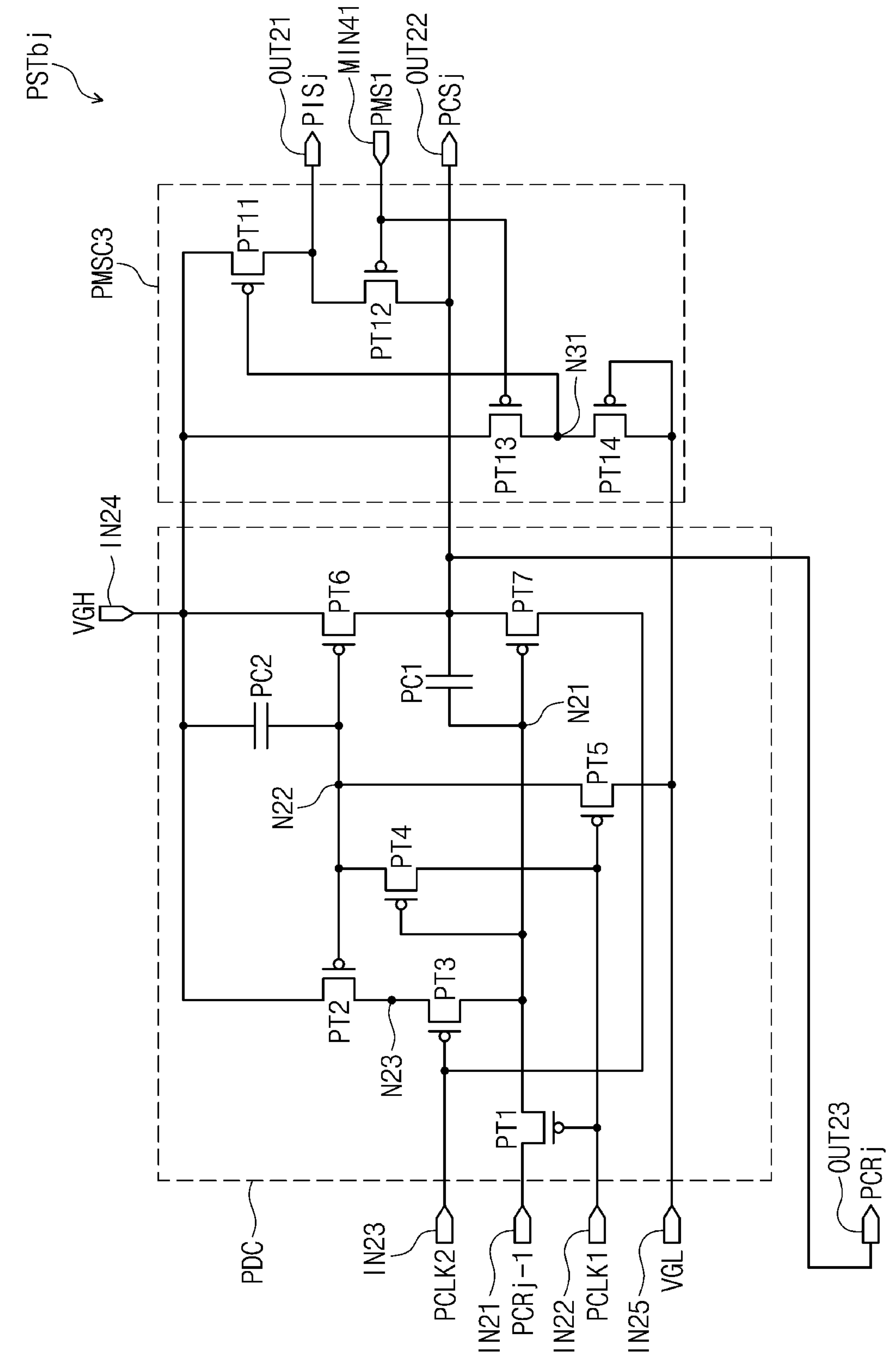
FIG. 21 is a schematic circuit diagram illustrating a j-th driving stage in a second scan driving circuit according to an embodiment.

FIG. 21 is a schematic circuit diagram showing a j-th driving stage PSTbj in the second scan driving circuit SD2 according to an embodiment.

Referring to FIG. 21, the driving stage PSTbj may include the driving circuit PDC, a masking circuit PMSC3, the first to fifth input terminals IN21 to IN25, the first masking input terminal MIN41, and the first to third output terminals OUT21 to OUT23.

The driving circuit PDC of the driving stage PSTbj and the driving circuit PDC illustrated in FIG. 18 may include the same circuit configuration.

The masking circuit PMSC3 may stop (or mask) the output of the third scan signal PISj in response to the masking signal PMS1. The masking circuit PMSC3 may include transistors PT11, PT12, PT13, and PT14.

The transistor PT11 may be connected between the fourth input terminal IN24 and the first output terminal OUT21 and may include a gate electrode electrically connected to a node N31. The transistor PT12 may be connected between the first output terminal OUT21 and the second output terminal OUT22 and may include a gate electrode electrically connected to the masking input terminal MIN41.

The transistor PT13 may be connected between the fourth input terminal IN24 and the node N31 and may include a gate electrode electrically connected to a masking input terminal MIN41. The transistor PT14 may be connected between the node N31 and the fifth input terminal IN25 and may include a gate electrode electrically connected to the fifth input terminal IN25. The transistor PT14 has a diode connection structure.

The masking signal PMS1 received through the masking input terminal MIN41 of the masking circuit PMSC3 and the first masking signal PMS1 received through the first masking input terminal MIN21 of the first masking circuit PMSC1 illustrated in FIG. 18 may have the same waveform.

Referring to FIGS. 19 and 21, while the masking signal PMS1 is at a low level, the transistors PT12 and PT13 may be turned on. Therefore, the first output terminal OUT21 and the second output terminal OUT22 may be electrically connected.

If the masking signal PMS1 is at a high level in the low power mode L-MODE, the transistors PT12 and PT13 may be turned off. Therefore, the electrical connection between the first output terminal OUT21 and the second output terminal OUT22 may be blocked. As the transistor PT13 is turned off, the node N31 may be at the first voltage VGL level, and as a result, the transistor PT11 may be turned on. As a result, the first output terminal OUT21 may output the third scan signal PISj of a high level.

Since the first clock signal PCLK1 and the second clock signal PCLK2 thereafter are both at a low level, the second node N22 may be maintained at a low level. As the second node N22 is maintained at a low level, the transistor PT6 may be maintained to be in the state of being turned on, so that the fourth scan signal PCSj may be masked to a high level.

A display device having such a configuration may drive a first display region in which a moving image is displayed and a second display region in which a still image is displayed at different driving frequencies. Power consumption may be reduced by lowering the driving frequency of a second display region in which a still image is displayed lower than the driving frequency of a first display region in which a moving image is displayed.

Although the disclosure has been described with reference embodiments of the disclosure, it will be understood by those skilled in the art that various modifications and changes in form and details may be made therein without departing from the spirit and scope of the disclosure as set forth in the claims. The embodiments disclosed in the disclosure are not intended to limit the technical spirit of the disclosure, and all technical concepts falling within the scope of the claims and equivalents thereof are to be construed as being included in the scope of the claimed invention.

What is claimed is:

1. A scan driving circuit comprising:

a first output terminal;

a second output terminal;

a driving circuit outputting a second scan signal to the second output terminal in response to clock signals and a carry signal; and a first masking circuit electrically connecting the first output terminal to the second output terminal in response to a first masking signal, and discharging the first output terminal to a first voltage in response to a signal of an internal node of the driving circuit.

2. The scan driving circuit of claim 1, wherein the first masking circuit receives the second scan signal and outputs a first scan signal to the first output terminal in response to the first masking signal.

3. The scan driving circuit of claim 1, wherein the first masking circuit comprises a first transistor connected between the first output terminal and an input terminal receiving the first voltage, the first transistor including a gate electrode electrically connected to the internal node.

4. The scan driving circuit of claim 3, wherein the first masking circuit further comprises a second transistor connected between the first output terminal and the second output terminal, the second transistor including a gate electrode electrically connected to an input terminal receiving the first masking signal.

5. The scan driving circuit of claim 3, further comprising a second masking circuit masking the second scan signal to a predetermined level in response to a second masking signal.

6. The scan driving circuit of claim 5, wherein the second masking circuit comprises:

a third transistor electrically connected between a first node of the driving circuit and a second node and including a gate electrode electrically connected to an input terminal receiving the second masking signal; and a fourth transistor electrically connected between the second node and the input terminal receiving the first voltage and including a gate electrode electrically connected to the second output terminal.

7. The scan driving circuit of claim 6, wherein the first masking circuit masks the second scan signal to the first voltage in response to the signal of the internal node, and the second masking circuit masks a signal of the first node to the first voltage in response to the second masking signal and the second scan signal.

8. The scan driving circuit of claim 3, wherein the first masking circuit further comprises a capacitor connected between the first output terminal and the input terminal receiving the first voltage.

9. A scan driving circuit comprising:

a first output terminal;

a second output terminal;

a masking circuit electrically connecting the first output terminal to the second output terminal in response to a first masking signal, and electrically connecting a first output terminal to a input terminal receiving a first voltage in response to a second masking signal; and a driving circuit outputting a second scan signal to the second output terminal in response to clock signals and a carry signal, wherein;

when the first output terminal is connected to the second output terminal, the masking circuit outputs a first scan signal to the first output terminal, and when the first output terminal is connected to the first input terminal, the masking circuit outputs the first voltage to the first output terminal.

10. The scan driving circuit of claim 9, wherein the masking circuit comprises:

a first masking circuit electrically connecting the first output terminal and the second output terminal and outputting the first scan signal to the first output terminal in response to the first masking signal; and a second masking circuit electrically connecting the first input terminal and the first output terminal in response to the second masking signal.

11. The scan driving circuit of claim 10, wherein the first masking circuit comprises a first transistor connected between the first output terminal and the second output terminal, the first transistor including a gate electrode receiving the first masking signal.

12. The scan driving circuit of claim 10, wherein the second masking circuit comprises a second transistor connected between the second output terminal and the first input terminal receiving the first voltage, the second transistor including a gate electrode receiving the second masking signal.

13. The scan driving circuit of claim 10, wherein the driving circuit outputs a first signal corresponding to the carry signal to a first node in response to the clock signals and the carry signal, and the first signal is provided to the second masking circuit as the second masking signal.

14. A display device comprising:

a display panel including a pixel electrically connected to a data line, a first scan line and a second scan line;

a data driving circuit which drives the data line;

a scan driving circuit which drives the first scan line and the second scan line; and a driving controller which controls the data driving circuit and the scan driving circuit, and outputs a first masking signal, wherein the scan driving circuit comprises:

a first output terminal electrically connected to the first scan line;

a second output terminal electrically connected to the second scan line;

a driving circuit outputting a second scan signal to the second output terminal in response to clock signals and a carry signal; and a first masking circuit electrically connecting the first output terminal to the second output terminal in response to the first masking signal, and discharging the first output terminal to a first voltage in response to a signal of an internal node of the driving circuit.

15. The display device of claim 14, wherein the first masking circuit receives the second scan signal and outputs a first scan signal to the first output terminal in response to the first masking signal.

16. The display device of claim 14, wherein the first masking circuit comprises a first transistor connected between the first output terminal and an input terminal receiving the first voltage, the first transistor including a gate electrode electrically connected to the internal node.

17. The display device of claim 16, wherein the first masking circuit further comprises a second transistor connected between the first output terminal and the second output terminal, the second transistor including a gate electrode electrically connected to an input terminal receiving the first masking signal.

18. A display device comprising:

a display panel including a pixel electrically connected to a data line, a first scan line and a second scan line;

a data driving circuit which drives the data line;

a scan driving circuit which drives the first scan line and the second scan line; and a driving controller which controls the data driving circuit and the scan driving circuit, and outputs a first masking signal and a second masking signal, wherein the scan driving circuit comprises:

a first output terminal electrically connected to the first scan line;

a second output terminal electrically connected to the second scan line;

a masking circuit electrically connecting the first output terminal to the second output terminal in response to the first masking signal and electrically connecting the first output terminal to a input terminal receiving a first voltage in response to the second masking signal; and a driving circuit outputting a second scan signal to the second output terminal in response to clock signals and a carry signal, wherein, when the first output terminal connected to the second output terminal, the masking circuit outputs a first scan signal to the first output terminal, and when the first output terminal connected to the first input terminal, the masking circuit outputs the first voltage to the first output terminal.

19. The display device of claim 18, wherein the masking circuit comprises:

a first masking circuit electrically connecting the first output terminal and the second output terminal, and outputting the first scan signal to the first output terminal in response to the first masking signal; and a second masking circuit electrically connecting the first input terminal and the first output terminal in response to the second masking signal.

20. The scan driving circuit of claim 19, wherein the first masking circuit comprises a first transistor connected between the first output terminal and the second output terminal, the first transistor including a gate electrode receiving the first masking signal, and the second masking circuit comprises a second transistor connected between the second output terminal and the first input terminal receiving the first voltage, the second transistor including a gate electrode receiving the second masking signal.

* * * * *